United States Patent
Li et al.

(10) Patent No.: US 11,463,005 B2
(45) Date of Patent: Oct. 4, 2022

(54) RAMP GENERATOR FOR BUCK/BOOST CONVERTERS

(71) Applicant: TEXAS INSTRUMENTS INCORPORATED, Dallas, TX (US)

(72) Inventors: Huijuan Li, Plano, TX (US); Ronnie Antone Bean, Lenoir City, TN (US); Benjamin McCue, Clinton, TN (US); Ryan Erik Lind, Knoxville, TN (US)

(73) Assignee: Texas Instruments Incorporated, Dallas, TX (US)

( * ) Notice: Subject to any disclaimer, the term of this patent is extended or adjusted under 35 U.S.C. 154(b) by 131 days.

(21) Appl. No.: 16/859,467

(22) Filed: Apr. 27, 2020

(65) Prior Publication Data
US 2021/0336542 A1 Oct. 28, 2021

(51) Int. Cl.
*H02M 3/158* (2006.01)
*H02M 1/00* (2006.01)

(52) U.S. Cl.
CPC ....... *H02M 3/1582* (2013.01); *H02M 1/0025* (2021.05)

(58) Field of Classification Search
CPC .......................... H02M 3/1582; H02M 1/0025
See application file for complete search history.

(56) References Cited

U.S. PATENT DOCUMENTS

| | | | | |
|---|---|---|---|---|
| 5,537,027 A * | 7/1996 | Jordan | ...................... | H03K 6/00 702/124 |
| 6,166,527 A * | 12/2000 | Dwelley | ............. | H02M 3/1582 323/222 |
| 7,064,694 B1 * | 6/2006 | Male | ...................... | H03M 1/162 341/129 |
| 7,075,353 B1 * | 7/2006 | Wan | ......................... | G06F 1/04 327/295 |
| 7,388,413 B1 * | 6/2008 | Ball | ........................ | H03K 4/501 327/131 |
| 10,833,661 B1 * | 11/2020 | Archibald | .............. | H03K 3/037 |
| 2007/0210782 A1 * | 9/2007 | Prexl | ................... | H02M 3/1582 323/288 |
| 2010/0019745 A1 * | 1/2010 | Keskar | .................... | H03K 17/16 323/271 |
| 2010/0148740 A1 * | 6/2010 | Saitoh | ................. | H02M 3/1582 323/283 |

(Continued)

*Primary Examiner* — Gustavo A Rosario-Benitez
(74) *Attorney, Agent, or Firm* — Mark A. Valetti; Charles A. Brill; Frank D. Cimino

(57) ABSTRACT

In some examples, a converter circuit can be configured to operate in a buck-boost mode. The converter circuit can include a ramp generator that can be configured to generate first and second ramp signals that at least partially overlap respective portions of a buck-boost region during each intermediate clock cycle between clock cycles of a clock signal. By generating the first and second ramp signals during each intermediate clock cycle, first and second drivers can be provided to toggle switches of a power stage, such that an output voltage provided by the power stage can be averaged out over clock cycles of the clock signal to allow for a gradual transition between buck and boost modes of operation of the converter circuit. In some examples, the converter circuit can be configured to operate in a test mode and can be configured to implement trimming of a ramp signal.

15 Claims, 7 Drawing Sheets

(56) References Cited

U.S. PATENT DOCUMENTS

| | | | |
|---|---|---|---|
| 2011/0199062 A1* | 8/2011 | Singnurkar | H02M 3/1582 323/282 |
| 2013/0320949 A1* | 12/2013 | Prexl | H02M 3/158 323/290 |
| 2015/0214934 A1* | 7/2015 | Luan | H03K 4/50 331/111 |
| 2016/0105110 A1* | 4/2016 | Houston | H02M 3/1582 323/271 |
| 2018/0131378 A1* | 5/2018 | Haroun | H03K 5/135 |
| 2020/0266702 A1* | 8/2020 | Zhao | H02M 3/1582 |
| 2020/0295657 A1* | 9/2020 | Weiers | H02M 3/1582 |
| 2021/0152088 A1* | 5/2021 | Volk | H02M 3/157 |

* cited by examiner

RAMP GENERATOR FOR BUCK/BOOST CONVERTERS

TECHNICAL FIELD

This disclosure relates to buck-boost voltage converters. More particularly, this disclosure relates to operation mode transition in buck-boost voltage converters.

BACKGROUND

Switching regulators can be used to provide a substantially constant output voltage or output current over a range of input voltages, input disturbances, output load changes, and the like. Switching regulators can be used in battery-operated devices (e.g., portable phones, digital cameras, laptop computers and automotive applications) or powered devices (e.g., video game platforms, robots and industrial applications). Switching regulators such as buck regulators, boost regulators, buck-boost regulators, switched capacitor regulators, and the like can be arranged in a switching mode power supply (SMPS). The SMPS may be implemented according to a variety of different topologies including flyback, forward, buck, boost and buck-boost. In a buck-boost typology, a buck-boost voltage converter is configured to generate an output voltage (e.g., a direct-current (DC) output voltage) based on an input voltage (e.g., a DC input voltage). When operating in a buck mode, the buck-boost voltage converter is configured to generate an output voltage that is less than or equal to the input voltage. When operating in a boost mode, the buck-boost voltage converter is configured to generate an output voltage that is greater than or equal to the input voltage.

SUMMARY

This disclosure relates to buck-boost voltage converters. More particularly, this disclosure relates to operation mode transition in buck-boost voltage converters.

In an example, a converter circuit can include a ramp generator that can be configured to generate a first ramp signal and a second ramp signal during each clock cycle of a clock signal during a buck-boost operating mode of the converter circuit. The ramp generator can be configured to generate the first ramp signal to at least partially overlap a portion of a buck-boost region during a first portion of an intermediate clock cycle between clock cycles of the clock signal. The ramp generator is further configured to generate the second ramp signal to at least partially overlap a portion of the buck-boost region during a second portion of the intermediate clock cycle between the clock cycles of the clock signal.

In another example, a method for controlling a buck-boost converter circuit can include generating a boost ramp signal to at least partially overlap a portion of a buck-boost region during an on-period of each intermediate clock cycle between clock cycles of a clock signal and generating a boost driver signal to provide an output voltage based on the boost ramp signal and an error signal during the on-period of each intermediate clock cycle between the clock cycles of the clock signal. The method can further include generating a buck ramp signal to at least partially overlap a portion of the buck-boost region during an off-period of each intermediate clock cycle between the clock cycles of the clock signal and generating a buck driver signal to provide the output voltage based on the buck ramp signal and the error signal during the off-period of each intermediate clock cycle between the clock cycles of the clock signal.

In a further example, a method can include controlling a buck-boost converter to operate in a test operating mode, and while operating in the test operating mode, the method can include providing a current signal from a current source to one of a first storage circuit and a second storage circuit to store a charge and generating one of a first ramp signal and a second ramp signal based on the charge stored at one of the first storage circuit and the second storage circuit. The first and second ramp signals can have an amplitude that is proportional to an amount of charge stored at one of the first storage circuit and the second storage circuit. The method can further include increasing an amplitude of the current signal to increase a ramp height of one of the first and second ramp signals. The ramp height can correspond to the amplitude of one of the first and second storage circuits. The method can further include outputting at one of a first comparator and a second comparator of the buck-boost converter a logical high value to provide an indication of a capacitance of one of the first and the second storage circuits in response to the amplitude of one of the first ramp signal and the second ramp signal being equal to an amplitude of a ramp height reference signal.

In another example, an electronic system can include a clock source and a buck-boost converter circuit. The buck-boost converter circuit can include a ramp generator circuit that can have a clock input coupled to the clock source, a first ramp signal output and a second ramp signal output. The buck-boost converter can further include a drive circuit that can include a first input that can be coupled to the first ramp signal output, a second input that can be coupled to the second ramp signal output, a first drive signal output and a second drive signal output. The buck-boost converter can further include a power stage that can be coupled to the first drive signal output and the second drive signal output. The first ramp signal output can at least partially overlap a portion of a buck-boost region during a first portion of a clock cycle and the second ramp signal output can partially overlap a portion of the buck-boost region during a second portion of the clock cycle.

In some examples, a buck-boost converter is configured to operate in different modes including a boost mode, a buck mode, and a buck-boost mode. The buck-boost converter can include mode operating logic for controlling an operating mode of the buck-boost converter. In the buck-boost mode, the buck-boost converter can be configured to transition a duty cycle of the buck-boost converter from about 100% to about 0%. The mode operating logic can be configured to cause the buck-boost converter to operate in the buck-boost mode to provide for a smooth transition between the buck and boost operating modes and thus reduce (e.g., minimize) harmonic noise in an output voltage being provided by the buck-boost converter. By reducing the harmonic noise in the output voltage can reduce a risk of loading circuitry that is sensitive to being damaged. In the buck-boost mode, the mode operating logic can be programmed to cause a ramp generator to generate first and second ramp signals. The first ramp signal can be generated based on a charge stored at a first storage circuit and the second ramp signal can be generated based on a charge stored at a second storage circuit. The first and second ramp signals can be generated to partially overlap a buck-boost region that occurs during each intermediate clock cycle between clock cycles of a main clock signal. The term "buck-boost region" as used herein refers to a predetermined error voltage range for an error signal that is based on a difference between a target output voltage and measured output voltage of a buck-boost converter. The predetermined error voltage range includes a minimum error voltage and a maximum error voltage. During the buck-boost mode, the error signal can have an amplitude that can be within the error voltage range.

For example, the first ramp signal (e.g., a buck ramp signal) partially overlaps the buck-boost region when an amplitude of the first ramp signal increases from a first voltage that is similar to the minimum error voltage to a second voltage that is similar to the maximum error voltage and decreases from the second voltage back to the first voltage during the intermediate clock cycle. The first ramp signal can partially overlap the buck-boost region that occurs during each intermediate clock cycle between the clock cycles of the main clock signal. By way of further example, the first ramp signal partially overlaps the buck-boost region during an off-period of each intermediate clock cycle.

In further examples, a second ramp signal (e.g., a boost ramp signal) partially overlaps the buck-boost region when an amplitude of the second ramp signal decreases from the second voltage that is similar to the maximum error voltage to the first voltage that is similar to the minimum error voltage and increases from the first voltage back to the second voltage during the intermediate clock cycle. The second ramp signal can partially overlap the buck-boost region that occurs during each intermediate clock cycle between the clock cycles of the main clock signal. By way of further example, the second ramp signal partially overlaps the buck-boost region during an on-period of each intermediate clock cycle. In some examples, the first and second ramp signals can partially overlap the buck-boost region a similar amount of time.

Each of the first and second ramp signals can be provided to respective first and second comparators. The first comparator (e.g., a buck comparator) can be configured to generate a first driver signal based on the first ramp signal and the output voltage error signal. The second comparator (e.g., a boost comparator) can be configured to generate a second driver signal based on the second ramp signal and the output voltage error signal. By causing the first and second ramp signals to partially overlap for a similar amount of time during each intermediate clock cycle of the main clock signal, the first and second driver signals can have similar pulse widths (e.g., on times).

The buck-boost converter can include a power stage. The power stage can include switches. The first driver signal can be employed to drive a first switch and the second driver can be employed to drive a second switch. The switches can be activated (e.g., closed) in an alternating manner during each intermediate clock cycle. For example, the first switch is activated at a first instance of time and the second switch can be activated at a second instance of time during each intermediate clock cycle. By activating the switches in an alternating manner over a window of time that includes multiple portions of the intermediate clock cycle, the output voltage can be averaged in the buck-boost region. The averaging of the output voltage reduces errors in the output voltage, such as caused by harmonics. Thus, harmonics in the output voltage, resulting from switching operating modes, can be reduced in response to the buck-boost converter transitioning from the buck mode to the boost mode of operation. By reducing the harmonics in the output voltage can allow for the buck-boost converter to transition smoothly from the buck mode to the boost mode.

In some examples, the buck-boost converter is configured to operate in a test mode. In the test mode, ramp trimming logic can be programmed to cause a ramp signal (e.g., the first and the second ramp signal) to be trimmed. Due to process variations, the ramp signal may need trimming to ensure proper operation (e.g., switching of the buck and boost switches) of the buck-boost converter. By way of example, the ramp trimming logic is programmed to set the amplitude of the ramp signal, such that the ramp signal has a desired ramp height (e.g., a maximum ramp amplitude) during the test mode. The mode operating logic can be programmed to determine a capacitance of a storage circuit (e.g., the first storage circuit or the second storage circuit) based on a voltage established by the storage circuit and an amount of current that is provided to the storage circuit. The ramp trimming logic can employ the determined capacitance to set a maximum amplitude of the ramp signal to the desired ramp height.

By way of example, in the test mode, the ramp trimming logic is programmed to cause a current signal from a current source to be provided to the storage circuit (preferably a capacitor or an inductor but can be another form of passive or active storage device). The storage circuit can be configured to store a charge based on the current signal. The storage circuit can be configured to generate the ramp signal with a voltage amplitude that can be based on an amount of charge stored at the storage circuit. The slope of the ramp signal can be based on a rate at which charge is being stored at the storage circuit based on the current signal. Thus, a current amplitude of the current signal can determine the rate at which charge is stored at the storage circuit.

To set the maximum amplitude of the ramp signal, the ramp trimming logic can be programmed to cause a ramp height reference signal to be outputted. The ramp height reference signal can be generated based on the input voltage and a ramp gain value. In some examples, the ramp height reference signal is provided to a comparator (e.g., the first comparator or the second comparator). In some examples, the ramp trimming logic is programmed to begin at a first trim code (e.g., a trim code 0) and step through each trim code until the comparator outputs a logical high value. A respective trim code can be indicative of an amplitude of the current signal. As the ramp trimming logic steps through each trim code, the current source can be configured to provide additional current to the storage circuit to store additional charge at the storage circuit in response to the ramp trimming logic, such that the current signal increases in amplitude. Each trim code can correspond to a voltage reference value adjustment that causes the ramp generator to generate a ramp voltage with a desired ramp height voltage. The comparator can be configured to output the logical high value in response to the ramp height reference voltage having an amplitude equal to the amplitude the ramp signal. The ramp trimming logic can be programmed to log in memory (e.g., register of the buck-boost converter) a corresponding trim code at which the comparator outputted by the logical high value for setting the height of the ramp signal during non-testing operation modes of the buck-boost converter.

By employing the ramp trimming logic to set a ramp height of the ramp signal reduces an amount of time needed for setting the ramp height of the ramp signal in contrast to existing ramp trimming techniques that rely on automatic test equipment (ATE) for ramp trimming, such as frequency trimming techniques. Moreover, the ramp trimming procedure as described herein allows for individual trimming of ramp signals, and thus can reduce errors associated with existing techniques that are based on trimming a select ramp signal and using a determined offset code for the select ramp signal to offset a remaining ramp signal. Furthermore, by using the comparator of the ramp generator to provide the indication of the trim code for each ramp signal improves an accuracy of setting the ramp height at the desired ramp height voltage in contrast to existing ramp trimming techniques.

As used herein, the term "circuit" can include a collection of active and/or passive elements that perform a circuit function, such as an analog circuit and/or digital circuit. Additionally or alternatively, for example, the term "circuit" can include an integrated circuit (IC) where all or some of the circuit elements are fabricated on a common substrate (e.g., semiconductor substrate, such as a die or chip) or within a common package herein. For example, circuitry of a power converter (e.g., a ramp generator, comparators, driver circuitry, and the like) can be implemented on a semiconductor substrate. Additionally, the term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

DETAILED DESCRIPTION

Figure 1:
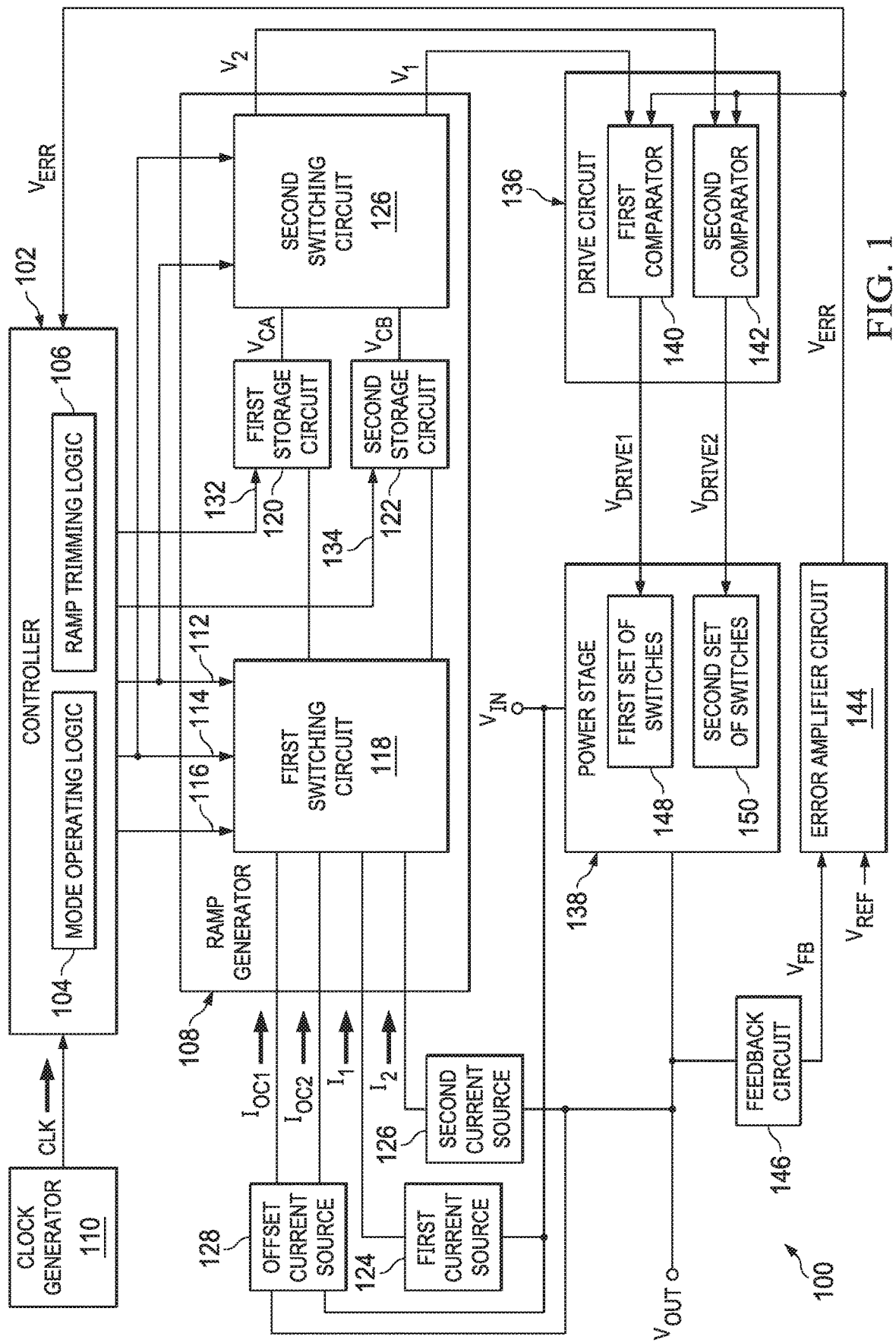
FIG. 1 illustrates an example of a buck-boost converter.

FIG. 1 illustrates an example of a buck-boost converter 100. In some examples, the buck-boost converter can be employed in an electronic system. By way of example, the electronic system is a battery-operated electronic device. The buck-boost converter 100 can be configured to generate an output voltage, $V_{OUT}$, based on an input voltage, $V_{IN}$, which can be provided by a voltage source (not shown in FIG. 1). In some examples, the input voltage is a direct-current (DC) input voltage. In this regard, the buck-boost converter 100 can be referred to as a DC-to-DC voltage converter. The buck-boost converter 100 can be configured to provide a regulated and selectable or preconfigured output voltage based on the input voltage.

The buck-boost converter 100 can include a controller 102. The controller 102 can include mode operating logic 104 and ramp trimming logic 106. The mode operating logic 104 and the ramp trimming logic 106 can be implemented in software (e.g., a set of instructions stored in memory (not shown in FIG. 1) of the controller 102) and employed to control operations of the buck-boost converter 100. In other examples, the mode operating logic 104 and the ramp trimming logic 106 are implemented as a combination of instructions and circuits that can be configured to perform one or more functions, as described herein. In further examples, the mode operating logic 104 and the ramp trimming logic 106 are representative of circuitry that can be configured to implement the one or more functions, as described herein. Although FIG. 1 illustrates the mode operating logic 104 and the ramp trimming logic 106 as part of the controller 102, in other examples, the mode operating logic 104 and the ramp trimming logic 106 are implemented completely or partially outside of the controller 102.

The buck-boost converter 100 can be configured to operate in different operating modes that can include a buck mode, a boost mode, and a buck-boost mode. In some examples, the different operating modes include a test mode for trimming a ramp signal, such as described herein. The mode operating logic 104 can be programmed to cause the controller 102 to generate switch control signals to control the buck-boost converter 100 during each operating mode. The buck-boost converter 100 can include a ramp generator 108 to generate the ramp signals. The mode operating logic 104 can be programmed to control generation of first and second ramp signals by the ramp generator 108 during each operating mode of the buck-boost converter 100. By way of example, the first ramp signal (labelled as $V_1$ in FIG. 1) is a buck ramp signal, $V_{BUCK}$, and the second ramp signal (labelled as $V_2$ in FIG. 1) is a boost ramp signals, $V_{BOOST}$.

In some examples, the mode operating logic 104 is programmed to cause the first and second ramp signals to be generated based on a main clock signal (labelled as CLK in FIG. 1). The main clock signal can be provided by a clock generator 110. In some examples, the clock generator 110 is an oscillator circuit. In some examples, the main clock signal has about a 50% duty cycle (e.g., an amount of time over the cycle length that the main clock signal is on, e.g., active, relative to an amount of time over the cycle length that the main clock signal is off, e.g., not active). In some examples, such as during at least one operating mode (e.g., the buck or the boost operating mode), the mode operating logic 104 is programmed to cause the controller 102 to provide first and second switch control signals 112 and 114 based on a respective first clock signal (CLK1) and a second clock signal (CLK2) (not shown). In some examples, the mode operating logic 104 is programmed to cause the controller 102 to provide a third switch control signal 116, such as during the buck-boost converter 100 operating in the buck-boost mode to allow for partial overlapping of a ramp signal of a buck-boost region during an intermediate clock cycle between clock cycles of the main clock signal.

The first and second clock signals can be derived based on the main clock signal. In some examples, the clock generator 110 is configured to divide the main clock signal to provide the first and second clock signals. In other examples, the main clock signal is provided to frequency division circuitry (not shown in FIG. 1) to generate the first and second clock signals. In some examples, the controller includes 102 includes the clock generator 110. Each of the first and the second clock signals can have different duty cycles and cycle lengths. In some examples, the clock signals have cycle lengths that are different from the cycle length of the main clock signal. In further examples, the first and second clock signals have similar or different duty cycles than the main clock signal. In some examples, the first and second clock signals have alternating on times over a respective period. Thus, in some examples, the first and second clock signals are about 180 degrees out of phase. The term "on-period" as used herein can correspond to a duration of time, $T_{ON}$ that a signal has a logical HIGH during a signal cycle and the term "off-period" as used herein can correspond to a duration of time, $T_{OFF}$, that the signal has a logical LOW during the signal cycle. In some examples, the second clock signal is an inverted clock signal of the first clock signal over the respective period.

The controller 102 is configured to selectively supply the first and second switch control signals 112 and 114 based on the first and second clock signals to control generation of first and second driver signals (labelled respectively as $V_{DRIVE1}$ and $V_{DRIVE2}$ in FIG. 1) during each operating mode of the buck-boost converter 100. Thus, the first and second clock signals can be employed to control the on-period of the first and second driver signals. The first driver signal can correspond to a buck driver signal $V_{DRIVE-BUCK}$ and the second driver signal can correspond to a boost driver signal $V_{DRIVE-BOOST}$. By employing pulse width modulation (PWM) to modulate the pulse widths of the first and second driver signals, the input voltage can be regulated to provide the output voltage with a desired voltage amplitude.

The ramp generator 108 can include a first switching circuit 118. The first switching circuit 118 can include switches that can be activated (e.g., opened and closed) to control a flow of a current from current sources to first and second storage circuits 120 and 122 of the ramp generator 108 based on the switch control signals 112, 114 and 116. Thus, the first switching circuit 118 can be configured to selectively supply a first current signal (labelled as $I_1$ in FIG. 1) from a first current source 124, a second current signal (labelled as $I_2$ in FIG. 1) from a second current source 126, and first and second offset current signals (labelled respectively as $I_{OC1}$ and $I_{OC2}$ in FIG. 1) from an offset current source 128 to the first and second storage circuits 120 and 122 based on the switch control signals 112, 114 and 116. By way of example, the first current source 124 is configured to provide the first current signal based on the input voltage. The second current source 126 can be configured to provide the second current signal based on the output voltage. In an example, the offset current source 128 is configured to provide first and second offset current signals having a magnitude that is a fraction of one of the first and second current signals.

For example, the offset current source 128 can be configured to provide the first offset current signal having a magnitude that is a fraction of the first current signal, and the second offset current signal having a magnitude that is a fraction of the second current signal. The first and second offset current signals can be provided by the first switching circuit 118 to respective first and second storage circuits 120 and 122 during the buck-boost mode operation during each clock cycle of the main clock signal to add positive and negative offset currents to the first and second ramp signals. The first offset current signal can have a positive amplitude, and in other examples, the first offset current signal has a negative amplitude. The second offset current signal can have a positive amplitude, and in other examples, the second offset current signal has a negative amplitude.

In some examples, the ramp generator 108 is referred to as a stacked ramp generator. The term "stacked" as used herein with respect a ramp generator of a buck-boost converter can refer to a ramp generator that is configured to generate a first ramp signal having a ramp height that is proportional to the input voltage to the buck-boost converter, and a second ramp signal that has a ramp height that is proportional to an output voltage provided by the buck-boost converter. The first ramp signal can correspond to the buck ramp signal $V_{BUCK}$ and the second ramp signal can correspond to the boost ramp signal $V_{BOOST}$. By way of further example, the first and second storage circuits 120 and 122 include at least one capacitor. A capacitance value of the at least one capacitor can be selected to generate respective first and second signals having a rise time that enables achieving a desired switching frequency for the buck-boost converter 100. For example, the switching frequency can be between about 100 kilohertz (KHz) to about 1 megahertz (MHz). In some examples, the at least one capacitor of each the first and second storage circuits 120 and 122 has substantially similar capacitance values (e.g., within a specified tolerance percentage).

During operation of the buck-boost converter 100 (e.g., during the buck mode, the boost mode or the buck-boost mode), the ramp generator 108 can be configured to generate ramp signals (e.g., the first and second ramp signals) that ramp from an initial ramp voltage (e.g., at about 0V) to a final ramp voltage (e.g., at about 1.5V) based on the first and second current signals during each of the first and second clock signals. The final ramp voltage can correspond to a height of the ramp signal. In some examples, the ramp signals are sawtooth waveforms. In other examples, the ramp signals is any waveform suitable as a PWM waveform for generation of the first and second driver signals, as described herein. Thus, in some examples, the ramp signals are triangle waveforms.

In some examples, the mode operating logic 104 is programmed to cause the controller 102 to generate the first switch control signal 112, for example, in response to detecting a rising edge of the first clock signal. The first switching circuit 118 is configured to supply the first current signal from the first current source 124 to the first storage circuit 120 during an on-period of the first clock signal in response to the first switch control signal 112. The first switching circuit 118 is further configured to supply the second current signal from the second current source 126 to the second storage circuit 122 in response to the first switch control signal 112 during the on-period of the first clock signal. Thus, a first set of switches of the first switching circuit 118 can be activated to provide a current path for the first current signal from the first current source 124 to the first storage circuit 120 and another current path for the second current signal from the second current source 126 to the second storage circuit 122 in response to the first switch control signal 112 during the on-period of the first clock signal. In some examples, as described herein, a set of switches can include a single switch or multiple switches.

The first storage circuit 120 can be configured to store a first charge during the on-period of the first clock signal based on the first current signal. The first charge can establish a first voltage signal (labelled as $V_{CA}$ in FIG. 1). The first voltage signal can increase from an initial first voltage to an intermediate first voltage that is greater than the initial first voltage during the on-period of the first clock signal based on the first stored charge. In some examples, during the off-period of the first clock signal, the first voltage signal increases from the intermediate first voltage to a final first voltage that is greater than the intermediate first voltage based on additional stored charge.

The second storage circuit 122 can be configured to store a second charge during the on-period of the first clock signal to establish a second voltage signal (labelled as $V_{CB}$ in FIG. 1) according to the second current signal. In some examples, the first switch control signal 112 is provided to a second switching circuit 130. The second switching circuit 130 can include switches that can be configured to provide the first ramp signal based on the first voltage signal with an amplitude that can be proportional to the first charge stored at the first storage circuit 120. In some examples, the second switching circuit 130 is configured to provide the second ramp signal based on the second voltage signal with an amplitude that can be proportional to the second charge stored at the second storage circuit 122. Thus, a first set of switches of the second switching circuit 130 can be activated to output the first and second ramp signals during the on-period of the first clock signal.

In some examples, during the on-period of the first clock signal, the amplitude of the first ramp signal increases from an initial first ramp voltage to a final first ramp voltage that is greater than the initial first ramp voltage as the first current signal charges the first storage circuit 120. The final first ramp voltage can correspond to the maximum voltage of the first ramp signal. During the on-period of the first clock signal, the amplitude of the second ramp signal can increase from an initial second ramp voltage to a final second ramp voltage that is greater than the initial second ramp voltage as the second current signal charges the second storage circuit 122. In some examples, the mode operating logic 104 is programmed to cause the controller 102 to provide a reset signal 132, such as, for example, in response to detecting a rising edge of a sequential first clock signal. The reset signal 132 can be provided to the first storage circuit 120 to discharge the first storage circuit 120 for a sequential charge cycle, such that the amplitude of the first voltage signal decreases from the final first voltage to the initial first voltage.

In some examples, the mode operating logic 104 is programmed to cause the controller 102 to provide the second switch control signal 114, such as, for example, in response to detecting a rising edge of the second clock signal. The controller 102 can be configured to supply the second switch control signal 114 to the first switching circuit 118 and to the second switching circuit 130. The first switching circuit 118 can be configured to supply the second current signal from the second current source 126 to the first storage circuit 120 during the on-period of the second clock signal in response to the second switch control signal 114 to store the first charge at the first storage circuit 120. Thus, a second set of switches of the first switching circuit 118 can be activated to provide a current path for the second current signal from the second current source 126 to the first storage circuit 120 and another current path for the first current signal from the first current source 124 to the second storage circuit 122 in response to the second switch control signal 114 during the on-period of the first clock signal. The first storage circuit 120 can be configured to store the first charge during the on-period of the second clock signal based on the second current signal, such that the amplitude of the first ramp signal increases from the initial first ramp voltage to the final first ramp voltage. The second switching circuit 130 can be configured to provide the first and second ramp signals in response to receiving the second switch control signal 114. Thus, a second set of switches of the second switching circuit 130 can be activated to provide the first and second ramp signals based on corresponding first and second voltages.

In some examples, the first switching circuit 118 is configured to supply the first current signal from the first current source 124 to the second storage circuit 122 during the on-period of the second clock signal in response to the second switch control signal 114 to store the second charge at the second storage circuit 122. The second voltage signal can be established based on the second charge stored at the second storage circuit 122 during the on-period of the second clock signal. The second voltage signal can increase from an initial second voltage to an intermediate second voltage that is greater than the initial second voltage over the on-period of the second clock signal. In an example, during the off-period of the second clock signal, the second voltage signal increases from the intermediate second voltage to a final second voltage that is greater than the intermediate second voltage.

In some examples, during the on-period of the second clock signal, the second ramp signal increases from the initial second ramp voltage to the final second ramp voltage corresponding to the maximum voltage of the second ramp signal based on the second current signal. The second switching circuit 130 can be configured to provide the first and second ramp signals in response to receiving the second switch control signal 114. Thus, a second set of switches of the second switching circuit 130 can be activated to provide the first and second ramp signals during the on-period of the second clock signal. In some examples, the mode operating logic 104 is programmed to cause the controller 102 to provide a reset signal 134, such as, for example, in response to detecting an edge of a sequential second clock signal. The reset signal 134 can be provided to the second storage circuit 122 to discharge the second storage circuit 122 for a sequential charge cycle, such that the amplitude of the second voltage signal decreases from the final second voltage to the initial second voltage.

Accordingly, the mode operating logic 104 can be programmed to control generation of the first and second ramp signals based on the first and second clock signals. The mode operating logic 104 can be programmed to cause the first and second storage circuits 120 and 122 to establish the first and second voltage signals that can have final respective first and second voltages that are delayed in time with respect to each other. For example, the first voltage signal can reach the final first voltage one clock cycle of the main clock signal prior to the second voltage signal reaching the final second voltage.

The first and second ramp signals can be provided to a drive circuit 136 of the buck-boost converter 100. In some examples, the drive circuit 136 is configured to selectively provide the first and second driver signals based on the first and second ramp signals and further based on an error signal. The first and second driver signals can be provided to a power stage 138 of the buck-boost converter 100 to provide the output voltage $V_{OUT}$ according to the first and second driver signals. In some examples, the drive circuit 136 includes a first comparator 140 and a second comparator 142. The first comparator 140 can correspond to a buck comparator and the second comparator 142 can correspond to a boost comparator. The first comparator 140 can be configured to receive the first ramp signal and the second comparator 142 can be configured to receive the second ramp signal during each on-period and off-period of the first and second clock signals, respectively.

In some examples, each of the first and second comparators 140 and 142 are configured to receive the error signal during each on-period and off-period of the first and second clock signals, respectively. The error signal can be generated by an error amplifier circuit 144 of the buck-boost converter 100. The error amplifier circuit 144 can be configured to generate the error signal based on a voltage feedback signal (labelled as $V_{FB}$ in FIG. 1) and a reference voltage signal (labeled as $V_{REF}$ in FIG. 1). The voltage feedback signal can be based on the output voltage. In some examples, a feedback circuit 146 is coupled to an output of the power stage 138 to receive the output voltage. The feedback circuit 146 can be configured to provide a portion of the output voltage corresponding to the voltage feedback signal. The reference voltage signal can determine (e.g., define) a target output voltage. Thus, the reference voltage signal can set a target amplitude of the output voltage.

In some examples, the error amplifier circuit 144 is configured to compare the voltage feedback signal and the reference voltage signal and output a difference signal corresponding to the error signal. An amplitude of the error signal can correspond to a duty cycle of either the first driver signal or the second driver signal based on which mode the buck-boost converter is operating. In some examples, the error signal is provided to the controller 102. The mode operating logic 104 can be programmed to evaluate the error signal to determine in which operating mode the buck-boost converter is to operate and to determine the duty cycle of the first driver signal (e.g., when the buck-boost converter 100 is operating in the buck mode) and the second driver signal (e.g., when the buck-boost converter 100 is operating in the boost mode).

By way of example, to set the operating mode of the buck-boost converter 100, the mode operating logic 104 is programmed to compare the error signal to error threshold references. The mode operating logic 104 can be programmed to cause the controller 102 to set the buck-boost converter 100 to operate in the buck mode, the boost mode or the buck-boost mode based on the comparison. In some examples, the error signal ranges from about 0V to about 1.5V. In some examples, if the error signal is between about 0V to about 0.64V, the buck-boost converter 100 is configured by the mode operating logic 104 to operate in the buck mode. In further examples, if the error signal is between about 0.86V to about 1.5V the buck-boost converter 100 is configured by the mode operating logic 104 to operate in the boost mode. In some examples, if the error signal is between about 0.65V to about 0.85V, the buck-boost converter 100 is configured by the mode operating logic 104 to operate in the buck-boost mode. In other examples, a different approach can be implemented to set the operating mode of the buck-boost converter 100. For example, the duty cycle of the first driver signal or the second driver signal can be evaluated and employed to set the operating mode of the buck-boost converter 100.

During each operating mode of the buck-boost converter 100, the first and second comparators 140 and 142 can be configured to compare a respective ramp signal (e.g., one of the first and second ramp signals) to the error signal. As each respective ramp signal increases during a corresponding on-period of the first and second clock signals, at least one respective ramp signal can intersect the error signal. The intersection can be referred to herein as a cross point. A timing of the cross point for the first and second comparators 140 and 142 can determine which mode the buck-boost converter operates (e.g., by the mode operating logic 104, as described herein), and the duty cycle of the first and second driver signals (e.g., the buck and boost driver signals). Thus, a duration of time between a first cross point of the error signal and the respective ramp signal and a second cross point of the error signal and the respective ramp signal can determine the duty cycle of a corresponding driver signal. Therefore, the error signal can vary the duty cycle between 0% to about 100% of each the first and second driver signals during each operating mode of the buck-boost converter 100 based on the amount of time between the first and second cross points. In some examples, the duty cycle, D, of each of the first and second driver signals can be expressed by the following equation:

$$D = \frac{T_{ON}}{(T_{ON} + T_{OFF})}, \quad (1)$$

wherein $T_{ON}$ is a duration of time that a respective driver signal is in a high state over a cycle of the driver signal, and $T_{OFF}$ is a duration of time that the respective driver signal is in a low (e.g., off) state over the cycle of the respective driver signal.

In some examples, the buck-boost converter 100 is configured to operate in the buck mode by the mode operating logic 104. In these examples, the output voltage is proportionally related to the input voltage, and the duty cycle of the first driver signal can be expressed by the following equation:

$$D = \frac{V_{OUT}}{V_{IN}}. \quad (2)$$

Based on equation (2), the output voltage can equal the input voltage when the duty cycle is about 100% and equal about zero when the duty cycle is about 0%. In this regard, when the buck-boost converter 100 operates in the buck mode, the output voltage can be less than or equal to the input voltage.

In some examples, the buck-boost converter 100 is configured to operate in the boost mode by the mode operating logic 104. In these examples, the output voltage is proportionally related to the input voltage, and the duty cycle of the second driver signal can be expressed by the following equation:

$$V_{OUT} = \frac{V_{IN}}{1 - D}. \quad (3)$$

Based on equation (3), the output voltage can be about equal to the input voltage when the duty cycle is about 0% and is greater than the input voltage when the duty cycle is greater than about 0%. In this regard, when the buck-boost converter 100 is configured to operate in the boost mode, the output voltage can be greater than or equal to the input voltage. As such, the buck-boost converter 100 can be configured to operate in the buck mode when the output voltage needs to be less than input voltage and in the boost mode when the output voltage needs to be greater than the input voltage.

In some examples, the error threshold references define operating ranges for the buck-boost converter 100. A first error threshold reference (e.g., about 0.64V) of the error threshold references can define a first operating region for the buck-boost converter 100, such as a boost operating region. A second error threshold reference (e.g., about 0.86V) of the error threshold references can define a third operating region for the buck-boost converter 100, such as a boost operating region. A third error threshold reference (e.g., about 0.65V) of the error threshold references can define a third operating region for the buck-boost converter 100, such as a buck-boost operating region.

By way of further example, in the buck mode, the first comparator 140 is configured to output the first driver signal having a duty cycle that is based on the first ramp signal and the error signal. The duty cycle of the first driver signal can be based on an amount of time between a first cross point of the error signal and the first ramp signal, and a second cross point of the error signal and the first ramp signal, such as during the on-period of the first and second clock signals. In some examples, such as during the buck mode, the error signal moves toward the first error threshold reference over time. For example, as the output voltage $V_{OUT}$ approaches the input voltage $V_{IN}$, the error signal can move toward the first error threshold reference (e.g., have an amplitude that is approaching the first error threshold reference) over time. In these examples, a pulse width of the first driver signal increases. As such, the amount of time between the first and second cross points can decrease as the error signal moves toward the threshold reference corresponding to increasing the pulse width of the first driver signal over time. As the amplitude of the error signal gets closer to the first error threshold reference, the duty cycle of the first driver signal can approach 100%.

In some examples, the drive circuit 136 is configured to supply the first driver signal to a first set of switches 148 of the power stage 138. The first set of switches 148 can correspond to buck switches. In some examples, the first set of switches 148 includes power switches. The power switches can include metal-oxide semiconductor field-effect transistors (MOSFETs), junction field-effect transistors (JFETs), bipolar junction transistors (BJTs), insulated gate bipolar transistors (IGBTS), high electron mobility transistors (HEMTs), or other types of power transistors depending on the use environment. The first set of switches 148 can be switched (e.g., in an alternative configuration) at a desired switching frequency to provide the output voltage. Accordingly as the error signal approaches the first error threshold reference, the amount of time between the first and second cross points can decrease and the buck mode duty cycle can increase. Thus, in response to the error signal equaling the first error threshold reference, the duty cycle of the buck-boost converter 100 can be about 100% and a select switch of the first set of switches 148 can be on for an entire clock cycle of the main clock signal.

By way of further example, if the error signal is equal to or greater than the third error threshold reference, the mode operating logic 104 is programmed to cause the buck-boost converter 100 to operate in the boost mode. In the boost mode, the second comparator 142 can be configured to output the second driver signal having a duty cycle that can be based on the second ramp signal and the error signal. The duty cycle of the second driver signal can be based on a time interval between a third cross point of the error signal and the second ramp signal, and a fourth cross point of the error signal and the second ramp signal, such as during the on-period of the first and second clock signals. In some examples, the first cross point occurs at about a similar time as the third cross point occurs in time. In further examples, the third cross point occurs at about a similar time as the fourth cross point occurs in time.

In some examples, such as during the boost mode, the error signal can move away from the third error threshold reference over time (e.g., have an amplitude value that increases relative to the third error threshold reference over time). For example, as the output voltage approaches the input voltage, the error signal moves away from the third error threshold reference over time, and a pulse width of the second driver signal can decrease. In this example, the amount of time between the third and fourth cross points during each clock signal decreases corresponding to decreasing the pulse width of the second driver signal. As the error signal moves away over time from the third error threshold reference, the duty cycle of the second driver signal can approach 100%.

In some examples, the drive circuit 136 is configured to supply the second drive signal to a second set of switches 150 of the power stage 138. The second set of switches 150 can correspond to boost switches. In some examples, the second set of switches 150 includes power switches, such as described herein. The second set of switches 150 can be switched (e.g., turned on and off in an alternating manner) to provide the output voltage that is greater than the input voltage. As the error signal moves away from the third error threshold reference over time, the amount of time between the third and fourth cross points can decrease and the boost mode duty cycle can increase. Thus, when the error signal is moving away from the third error threshold reference over time, the duty cycle of the buck-boost converter can approach about 100% and a select switch of the second set of switches 150 can be on for an entire clock cycle of the main clock signal.

By way of further example, if the error signal is equal to or greater than the second error threshold reference, the mode operating logic 104 is programmed to cause the buck-boost converter 100 to operate in the buck-boost mode. In some examples, the mode operating logic 104 is configured to cause the buck-boost converter 100 to operate in the buck-boost mode of operation to provide for a smooth transition between the buck and boost operating modes and thus reduce (e.g., minimize) harmonic noise in the output voltage. In the buck-boost mode of operation, the mode operating logic 104 can be programmed to cause the ramp generator 108 to generate the first and second ramp signals that can overlap a percentage of the buck-boost region during an intermediate clock cycle between clock cycles of the main clock signal. In some examples, the buck-boost region is referred to as an error voltage range for the error signal during the buck-boost mode.

In the buck-boost mode, the mode operating logic 104 can be programmed to cause the ramp generator 108 to generate first and second ramp signals that overlap for a similar amount of time corresponding to a similar percentage (e.g., about 10%) of the buck-boost region during an intermediate clock cycle that occurs between clock cycles of the main clock signal. The mode operating logic 104 can be programmed to cause the ramp generator 108 to generate the first ramp signal that can partially overlap a portion of the buck-boost region during the intermediate clock cycle of the main clock signal. In further examples, the mode operating logic 104 is programmed to cause the ramp generator 108 to generate the second ramp signal that partially overlaps a different portion of the buck-boost region during the intermediate clock cycle between the clock cycles of the main clock signal.

In some examples, during a sequential clock cycle following the intermediate clock cycle of the main clock signal, the mode operating logic 104 is programmed to cause the ramp generator 108 to generate the first and second ramps signals, such that the first and second ramp signals do not overlap the buck-boost region during each sequential clock cycle of the main clock signal. By way of further example, during another intermediate clock cycle of the main clock signal following the sequential clock cycle, the mode operating logic 104 is programmed to cause the ramp generator 108 to generate the first and second ramps signals, such that the first and second ramp signals overlap portions of the buck-boost region.

In some examples, the mode operating logic 104 is programmed to cause the drive circuit 136 to generate the first and second driver signals that have similar pulse widths during each intermediate clock cycle of the main clock signal. The first and second driver signals can be received at the power stage 138 and applied to respective switches of the first and second set of switches 148 and 150 in an alternating manner to toggle the buck-boost converter 100 between the buck mode and the boost mode in the buck-boost region. By toggling the respective switches of the first and second set of switches 148 and 150 alternatively during each intermediate clock cycle of the main clock signal, the output voltage can be averaged out in the buck-boost region, thus allowing for a gradual and smooth transition between buck and boost mode of operations.

By way of example, to cause the first ramp signal to partially overlap the buck-boost region, the mode operating logic 104 is configured to cause the controller 102 to generate the third switch control signal 116 to add a positive voltage offset to the first ramp signal generated during the intermediate clock cycle of the main clock signal. The third switch control signal 116 can be provided to the first switching circuit 118. The first switching circuit 118 can be configured to provide the second offset current signal with a positive amplitude to the second storage circuit 122 in response to the first switch control signal 112 and the third switch control signal 116, such as during the on-period of the first clock signal and the off-period during the second clock signal. The first switching circuit 118 can be configured to provide the second current signal to the second storage circuit 122 in response to receiving the first switch control signal 112, such as during the on-period of the first clock signal and the off-period during the second clock signal.

For example, the first set of switches can be activated to provide a current path for the second current signal from the second current source 126 to the second storage circuit 122 in response to the first switch control signal 112 during the on-period of the first clock signal and the off-period during the second clock signal. A third set of switches of the first switching circuit 118 can be activated to provide another current path for the second offset current signal with the positive amplitude from the offset current source 128 to the second storage circuit 122 in response to the first and third switch control signals 112 and 116 during the on-period of the first clock signal and the off-period during the second clock signal.

The second storage circuit 122 can be configured to generate the second ramp signal, such that the second ramp signal partially overlaps the buck-boost region during the intermediate clock cycle of the main clock signal. The addition of the positive voltage offset to the second ramp signal via the second offset current signal having the positive amplitude causes the second ramp signal to have the final second ramp voltage that is about equal to the maximum error voltage of the buck-boost region during the intermediate clock cycle of the main clock signal. The second ramp signal partially overlaps the buck-boost region in response to the amplitude of the second ramp signal increasing from a voltage value similar to the minimum error voltage of the buck-boost region to a greater voltage value similar to the maximum error voltage of the buck-boost region during the intermediate clock cycle of the main clock signal and decreasing back down to the minimum error voltage during the intermediate clock cycle of the main clock signal. The greater voltage value can correspond to the final second ramp voltage.

By way of further example, to cause the first ramp signal to partially overlap the buck-boost region, the mode operating logic 104 is programmed to cause the controller 102 to add a negative voltage offset to the first ramp signal generated during the intermediate clock cycle of the main clock signal. The first switching circuit 118 can be configured to provide the first offset current signal with a negative amplitude to the first storage circuit 120 in response to receiving the second and third switch control signals 114 and 116, such as during the off-period of the first clock signal and the on-period of the second clock signal. The first switching circuit 118 can be configured to provide the first current signal to the first storage circuit 120 in response to receiving the second switch control signal 114, such as during the off-period of the first clock signal and the on-period of the second clock signal.

For example, the second set of switches of the first switching circuit 118 can be activated to provide a current path for the first current signal from the first current source 124 to the first storage circuit 120 in response to the second switch control signal 114, such as during the off-period of the first clock signal and the on-period of the second clock signal. The third set of switches of the first switching circuit 118 can be activated to provide another current path for the first offset current signal with the negative amplitude from the offset current source 128 to the first storage circuit 120 in response to the second and third switch control signals 114 and 116 during the off-period of the first clock signal and the on-period of the second clock signal.

The first storage circuit 120 can be configured to generate the first ramp signal, such that the first ramp signal partially overlaps the buck-boost region, such as during the intermediate clock cycle of the main clock signal. The addition of the negative voltage offset to the first storage circuit 120 via the first offset current signal with the negative amplitude causes the first ramp signal to have the initial first ramp voltage that is about equal to the minimum error voltage of the buck-boost region during the intermediate clock cycle of the main clock signal. The first ramp signal partially overlaps the buck-boost region in response to the amplitude of the first ramp signal decreasing from a voltage value similar to the maximum error voltage of the buck-boost region to a lesser voltage value similar to the minimum error voltage of the buck-boost region during the intermediate clock cycle of the main clock signal and increasing back up to the maximum error voltage during the intermediate clock cycle of the main clock signal. The lesser voltage value can correspond to the initial first ramp voltage.

By way of example, during the off-period of the first clock signal and the on-period of the second clock signal for the sequential clock cycle of the main clock signal, the mode operating logic 104 is programmed to cause the controller 102 to add a negative voltage offset to the second ramp signal. The first switching circuit 118 can be configured to provide the first offset current signal with a positive amplitude and the first current signal to the second storage circuit 122 in response to receiving the second and third switch control signals 114 and 116, such as during the off-period of the first clock signal and the on-period of the second clock signal.

For example, the second set of switches of the first switching circuit 118 can be activated to provide a current path for the first current signal from the first current source 124 to the second storage circuit 122 in response to the second switch control signal 114, such as during the off-period of the first clock signal and the on-period of the second clock signal. The third set of switches of the first switching circuit 118 can be activated to provide another current path for the first offset current signal with the positive amplitude from the offset current source 128 to the second storage circuit 122 in response to the second and third switch control signals 114 and 116, such as during the off-period of the first clock signal and the on-period of the second clock signal.

The second storage circuit 122 can be configured to generate the second ramp signal based on the first current signal and the first offset current signal with the positive amplitude during the off-period of the first clock signal and the on-period of the second clock signal, such that the second ramp signal does not partially overlap the buck-boost region. The addition of the negative voltage offset to the second storage circuit 122 via the first offset current signal with the positive amplitude causes the second ramp signal to have the final second ramp voltage that is equal to about the minimum error voltage of the buck-boost region, and thus does not overlap the buck-boost region.

By way of example, during the off-period of the first clock signal and the on-period of the second clock signal for the sequential clock cycle of the main clock signal, the mode operating logic 104 is programmed to cause the controller 102 to add a positive voltage offset to the second ramp signal. The first switching circuit 118 can be configured to provide the second offset current signal with a negative amplitude to the first storage circuit 120 in response to receiving the second and third switch control signals 114 and 116, such as during the off-period of the first clock signal and the on-period of the second clock signal. The first switching circuit 118 can be configured to provide the second current signal to the first storage circuit in response to receiving the second switch control signal 114, such as during the off-period of the first clock signal and the on-period of the second clock signal.

For example, the second set of switches of the first switching circuit 118 can be activated to provide a current path for the second current signal from the second current source 126 to the first storage circuit 120 in response to the second switch control signal 114, such as during the off-period of the first clock signal and the on-period of the second clock signal. The third set of switches of the first switching circuit 118 can be activated to provide another current path for the second offset current signal with the negative amplitude from the offset current source 128 to the first storage circuit 120 in response to the second and third switch control signals 114 and 116, such as during the off-period of the first clock signal and the on-period of the second clock signal.

The first storage circuit 120 can be configured to generate the second ramp signal based on the second current signal and the second offset current signal with the negative amplitude during the off-period of the first clock signal and the on-period of the second clock signal, such that the second ramp signal does not partially overlap the buck-boost region. The addition of the positive voltage offset to the first storage circuit 120 via the second offset current signal with the negative amplitude causes the second ramp signal to have the initial second ramp voltage that is equal to about the maximum error voltage of the buck-boost region.

Accordingly, by causing the first and second ramp signals to partially overlap the buck-boost region during each intermediate clock cycle between clock cycles of the main clock signal, the first and second driver signals can have a similar pulse width. Respective switches of the first and second switches 148 and 150 can be activated in an alternating manner during each intermediate clock cycle of the main clock signal, such that the output voltage can be averaged out in the buck-boost region. Thus, the mode operating logic 104 can be programmed to enable the buck-boost converter 100 to smoothly transition between bucks and boost mode operating modes.

In some examples, the mode operating logic 104 is programmed to operate the buck-boost converter 100 in the test mode, such as to set a maximum ramp amplitude of a ramp signal, such as each of the first and second ramp signals. Due to process variations, a ramp signal (e.g., the buck and boost ramp signals) may need trimming to ensure proper operation (e.g., switching of the first and second switches 148 and 150) of the buck-boost converter 100. The controller 102 employs the ramp trimming logic 106 to selectively set the maximum amplitude of each the first and second ramp signals. In some examples, the ramp trimming logic 106 is part of the mode operating logic 104. The ramp trimming logic 106 can be programmed to cause the error amplifier circuit 144 to be disabled, such that the error amplifier circuit 144 does not output the error signal to the first and second comparators 140 and 142, and thus to the controller 102.

By way of example, in the test mode, the ramp trimming logic 106 is programmed to cause the controller 102 to output one of the first switch control signal 112 or the second switch control signal 114 for trimming a ramp height (e.g., the final first or second voltage) of the corresponding ramp signal (e.g., the first ramp signal or the second ramp signal). The first or second switch controls signals 112 and 114 can be provided to the first switching circuit 118. The first switching circuit 118 can be configured to supply a select current signal (e.g., the first current signal) to a respective circuit (e.g., the first or second storage circuits 120 and 122) in response to receiving the first or second switch controls signals 112 and 114. The respective storage circuit can be configured to store a charge (e.g., the first or the second charge) based on the select current signal. The respective storage circuit can be configured to generate the corresponding ramp signal with a voltage amplitude that can be based on an amount of charge stored at the respective storage circuit.

In some examples, the ramp trimming logic 106 is programmed to cause a ramp height reference signal (not shown) to be outputted. In an example, the ramp height reference signal is outputted by the controller 102. In other examples, a ramp height reference voltage circuit (not shown) is employed to provide the ramp height reference signal. The ramp height reference signal can be based on the input voltage and a ramp gain value. In some examples, the ramp height reference signal is provided to a select comparator (e.g., the first comparator 140 or the second comparator 142). In some examples, the ramp trimming logic 106 is programmed to begin at a select trim code (e.g., a trim code 0) and step through each trim code until the select comparator outputs a logical high. As the ramp trimming logic 106 steps through one trim code (e.g., the trim code 0) to a sequential trim code (e.g., the trim code 1), the ramp trimming logic 106 can be programmed to increasing an amount of current being provided by the select current signal. Thus, the ramp trimming logic 106 for each trim code can increase the amount of current being provided by the select current signal, and thus increase the amplitude of the corresponding ramp signal.

The select comparator (e.g., the first comparator 140 or the second comparator 142) can be configured to output the logical high value in response to the ramp height reference voltage having an amplitude equal to the amplitude the corresponding ramp signal. The ramp trimming logic 106 can be programmed to log the trim code at which the logical high value was outputted. In some examples, a latching circuit (not shown in FIG. 1) is coupled to an output of the select comparator. The latching circuit can be configured to latch in response to detecting the rising edge of a corresponding driver signal (e.g., the first driver signal or the second driver signal) outputted by the select comparator. The latching circuit can be configured to output a latch signal in response to detecting the rising edge of the corresponding driver signal. The ramp trimming logic 106 can be programmed to detect the latch signal and log the trim code at which the latching circuit outputted the latch signal. In some examples, the ramp trimming logic 106 is programmed to generate the ramp trim code based on the main clock signal, such as in response to detecting each rising or falling edge of the main clock signal.

By employing the ramp trimming logic 106 to set a ramp height of the ramp signal reduces an amount of time needed for setting the ramp height of the ramp signal in contrast to existing ramp trimming techniques that rely on ATE for ramp trimming, such as frequency trimming techniques. Moreover, the ramp trimming procedure as described herein allows for individual trimming of ramp signals, and thus can reduce errors associated with existing techniques that are based on trimming a select ramp signal and using a determined offset code for the select ramp signal to offset a remaining ramp signal. Furthermore, by using the comparator of the ramp generator to provide the indication of the trim code for each ramp signal improves an accuracy of setting the ramp height at the desired ramp height voltage in contrast to existing ramp trimming techniques.

Figure 2:
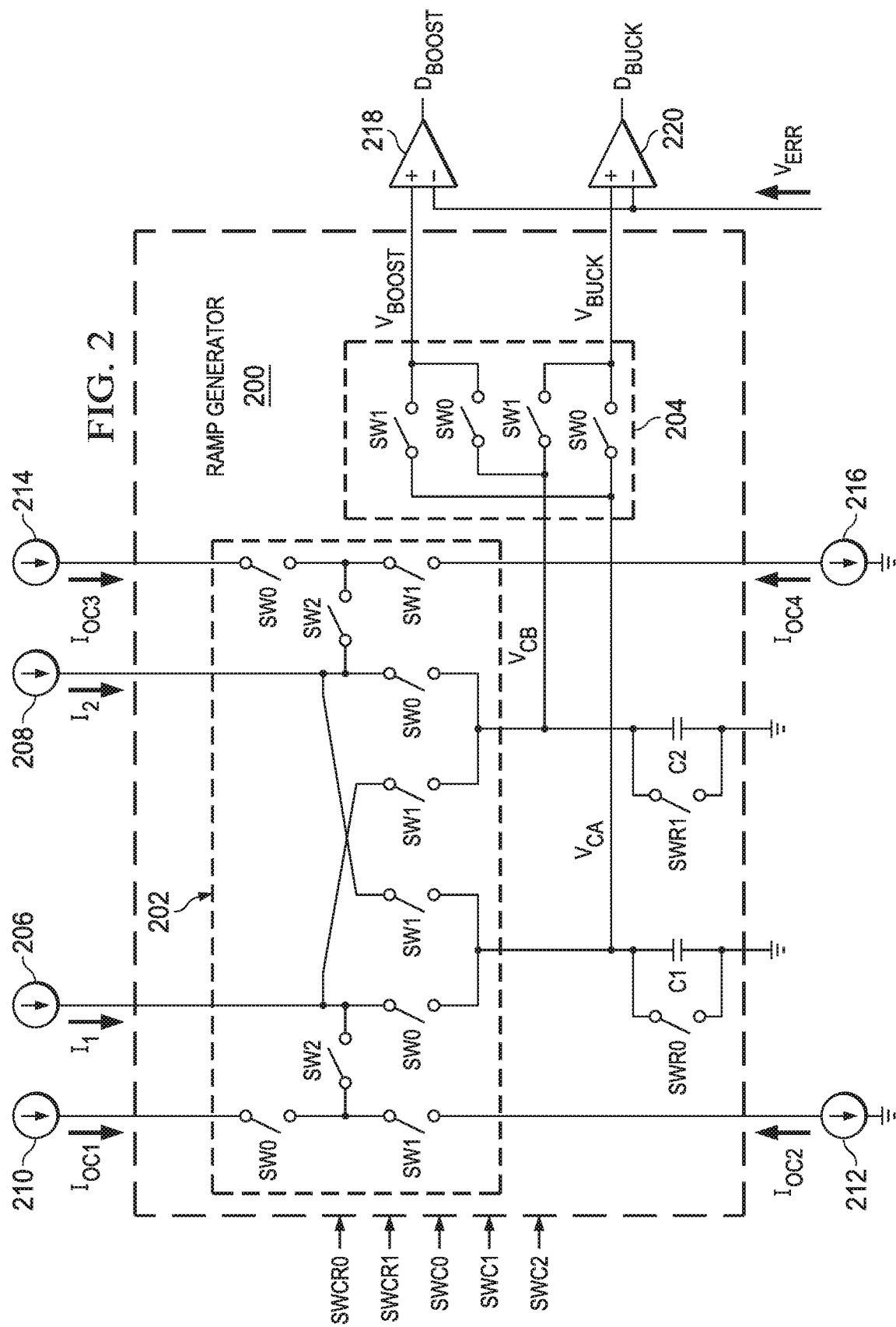
FIG. 2 illustrates an example of a ramp generator.

FIG. 2 illustrates an example of a ramp generator 200. In some examples, the ramp generator 200 can be employed in a buck-boost converter, such as the buck-boost converter 100, as illustrated in FIG. 1. Thus, in some examples, reference may be made to the example of FIG. 1 in the following description of the example of FIG. 2. During operation of the buck-boost converter, mode operating logic (e.g., the mode operating logic 104) can be programmed to operate the buck-boost converter in a buck mode, a boost mode, and a buck-boost mode. The mode operating logic can be programmed to cause switch control signals SWC0, SWC1 and SWC2 to be generated. By way of example, the switch controls signals SWC0, SWC1 and SWC2 correspond to the switch control signals 112, 114 and 116, as illustrated in FIG. 1. In some examples, the mode operating logic is programmed to cause a controller (e.g., the controller 102) to generate the switch control signals SWC0, SWC1 and SWC2 during a respective clock cycle of a main clock signal (e.g., the main clock signal CLK, as illustrated in FIG. 1). The mode operating logic can be programmed to control the ramp generator 200 to control generation of buck and boost ramp signals $V_{BUCK}$, $V_{BOOST}$ by selectively applying the switch control signals SWC0, SWC1 and SWC2 during each clock cycle of the main clock signal. Thus, the mode operating logic can be programmed to control generation of the buck and boost ramp signals by the ramp generator 200 during each operating mode of the buck-boost converter. In some examples, the buck and boost ramp signals correspond to the first and second ramp signals $V_1$, $V_2$, as illustrated in FIG. 1.

In some examples, during each operating mode of the buck-boost converter, the mode operating logic is programmed to cause the controller to provide the switch control signals SWC0, SWC1, and SWC2 based on respective first and second clock signals. The switch control signals SWC0, SWC1 and SWC2 can be generated based on respective first and second clock signal. The first and second clock signals can be generated based on the main clock signal. The first switch control signal SWC0 can be used to activate (e.g., close) switches SW0 of a first switching circuit 202 and switches SW0 of a second switching circuit 204 of the ramp generator 200, such as during each operating mode of the buck-boost converter. In some examples, the first switching circuit 202 is the first switching circuit 118 and the second switching circuit 204 is the second switching circuit 130, as illustrated in FIG. 1.

The second switch control signal SWC1 can be used to activate switches SW1 of the first switching circuit 202 and second switching circuits 204, such as during each operating mode of the buck-boost converter. The third switch control signal SWC2 can be used to activate switches SW2 of the first switching circuit 202, such as during the buck-boost mode of the buck-boost converter. The switch control signals SWC0 and SWC1 can be selectively applied to the switches SW0, SW1 and SW2 based on the first and second clock signals to selectively close the switches SW0 and SW2 to control generation of buck and boost driver signals $D_{BUCK}$ and $D_{BOOST}$.

In some examples, each of the switch control signals SWC0, SWC1 and SWC2 are provided to the first switching circuit 202 to control a flow of a current from a respective current source to a first capacitor C1 and second capacitor C2 of the ramp generator 200. Thus, the first switching circuit 202 can be configured to selectively supply a current from a first current source 206, a second current source 208, a first offset current source 210, and a second offset current source 212, a third offset current source 214 and a fourth offset current source 216 to the first and second capacitors based on the switch control signals SWC0, SWC1 and SWC2. In some examples, the first capacitor is the first storage circuit 120 and the second capacitor is the second storage circuit 122, as illustrated in FIG. 1. In further examples, the first current source 206 is the first current source 124, the second current source 208 is the second current source 126, and the offset current sources 210, 212, 214 and 216 can collectively form the offset current source 128, as illustrated in FIG. 1.

By way of example, the first current source 206 is configured to provide a first current signal (labelled as $I_1$ in FIG. 2) based on an input voltage (e.g., an input voltage $V_{IN}$, as illustrated in FIG. 1) to the buck-boost converter. The second current source 208 can be configured to provide a second current signal (labelled as $I_2$ in FIG. 2) based on an output voltage (e.g., the output voltage $V_{OUT}$, as illustrated in FIG. 1) provided by the buck-boost converter. In an example, the first offset current source 210 is configured to provide a first offset current signal (labelled as $I_{OC1}$ in FIG. 2) having a positive amplitude and the second offset current source 212 is configured to provide a second offset current signal (labelled as $I_{OC2}$ in FIG. 2) having a negative amplitude (shown in FIG. 2 by the direction of current flow for $I_{OC2}$) that can respectively have a portion of current as the first current signal. Thus, in some examples, the first and second offset current sources 210 and 212 are configured to receive the input voltage and provide the first and second offset current with respective positive and negative amplitudes having a magnitude that is a fraction of the first current signal. In some examples, the first and second offset current sources 210 and 212 are configured to provide a respective positive and negative current that has a flow of charge that can be a percentage (e.g., about 10%) of the first current signal.

In an example, the third offset current source 214 is configured to provide a third offset current signal (labelled as $I_{OC3}$ in FIG. 2) having a positive amplitude and the fourth offset current source 216 is configured to provide a fourth offset current signal (labelled as $I_{OC4}$ in FIG. 2) having a negative amplitude (shown in FIG. 2 by the direction of current flow for $I_{OC4}$) that can respectively have a magnitude that is a fraction of the second current signal. In an example, the third and fourth offset current sources 214 and 216 are configured to provide a respective positive and negative current that has a flow of charge that can be a percentage (e.g., about 10%) of the second current signal. The first, second, third and fourth offset current signals can be selectively provided by the first switching circuit 202 to respective first and second capacitors during the buck-boost mode operation to add positive and negative voltage offsets to the buck and boost ramp signals.

In some examples, such as during operation of the buck-boost converter the mode operating logic is programmed to cause the controller to generate the first switch control signal SWC0 in response to detecting a rising edge of the first clock signal. The first switch control signal SWC0 can be provided to the ramp generator 200 to close the switches SW0 of the first and second switching circuits 202 and 204 to provide a first current path between the first current source 206 and the first capacitor and a second current path between the second current source 208 and the second capacitor. The first switching circuit 202 is configured to supply the first current signal from the first current source 206 to the first capacitor along the first current path during an on-period of the first clock signal. The first switching circuit 202 is further configured to supply the second current signal along the second current path from the second current source 208 to the second capacitor during the on-period of the first clock signal.

The first capacitor can be configured to store a first charge (supplied by the first current source 206) during the on-period of the first clock signal. The first charge stored at the first capacitor can provide a first voltage signal (labelled as $V_{CA}$ in FIG. 2). The first voltage signal can increase from an initial first voltage to an intermediate first voltage that is greater than the initial first voltage during the on-period of the first clock signal. In some examples, during the off-period of the first clock signal, the first voltage signal increases from the intermediate first voltage to a final first voltage that is greater than the intermediate first voltage, such as based on the second current signals.

The second capacitor can be configured to store a second charge (supplied by the second current source 208) during the on-period of the first clock signal. The second charge stored at the second capacitor can provide a second voltage signal (labelled as $V_{CB}$ in FIG. 2). In some examples, the first switch control signal SW0 is provided to the second switching circuit 204 to close the switches SW0 of the second switching circuit 204. The second switching circuit 204 can be configured to provide the buck ramp signal based on the first voltage signal with an amplitude that can be proportional to the first charge stored at the first capacitor. In some examples, the second switching circuit 204 is configured to provide the boost ramp signal based on the second voltage signal with an amplitude that can be proportional to the second charge stored at the second capacitor.

During the on-period of the first clock signal, the amplitude of the boost ramp signal can increase from an initial boost voltage to a final boost voltage that is greater than the initial boost voltage as the second current signal charges the second capacitor. During the on-period of the first clock signal, the amplitude of the buck ramp signal can increase from an initial buck voltage to a final buck voltage that is greater than the initial buck voltage as the first current signal charges the first capacitor. In some examples, the mode operating logic is programmed to cause the controller to provide a first switch reset control signal SWCR0, such as, for example, in response to detecting a rising edge of a sequential first clock signal. The first switch reset control signal SWRC0 can be provided to a first reset switch SWR0 to close the first reset switch SWR0 to discharge the first capacitor for a sequential charge cycle, such that the amplitude of the first voltage signal decreases from the final first voltage to the initial first voltage. Thus, in some examples, the first capacitor is configured to be reset within a clock cycle of the first clock signal. The first switch reset control signal SWCR0 can correspond to the reset signal 132, as illustrated in FIG. 1.

In some examples, the mode operating logic is programmed to cause the controller to provide the second switch control signal SWC1, such as, for example, in response to detecting a rising edge of the second clock signal. The second switch control signal SWC1 can be provided to the ramp generator 200 to close the switches SW1 of the first and second switching circuits 202 and 204. The closing of the switches SW1 of the first switching circuit 202 provides a third current path from the first current source 206 to the second capacitor and a fourth current path from the second current source 208 to the first capacitor. The first switching circuit 202 is configured to supply the second current signal from the second current source 208 via the fourth current path to the first capacitor during the on-period of the second clock signal to store the first charge at the first capacitor. The first capacitor can be configured to store the first charge during the on-period of the second clock signal based on the second current signal, such that the amplitude of the boost ramp signal increases from the initial boost voltage to the final boost voltage corresponding to a maximum voltage of the boost ramp signal. The second switching circuit 204 can be configured to provide the buck ramp signal in response to receiving the second switch control signal SWC2.

In some examples, the first switching circuit 202 is configured to supply the first current signal from the first current source 206 to the second capacitor via the third current path during the on-period of the second clock signal to store the second charge at the second capacitor. The second capacitor can be configured to store the second charge to provide the second voltage signal. The second voltage signal can increase from an initial second voltage to an intermediate second voltage that is greater than the initial second voltage over the on-period of the second clock signal. In some examples, during the off-period of the second clock signal, the second voltage signal increases from the intermediate second voltage to a final second voltage that is greater than the intermediate second voltage. In some examples, during the on-period of the second clock signal, the buck ramp signal increases from the initial buck voltage to the final buck voltage corresponding to a maximum voltage of the buck ramp signal based on the first current signal.

The second switching circuit 204 can be configured to provide the buck ramp signal in response to receiving the second switch control signal SWC1. In some examples, the mode operating logic is programmed to cause the controller to provide a second switch reset control signal SWCR1, such as, for example, in response to detecting an edge of a sequential second clock signal. The second switch reset control signal SWCR1 can be provided to a second reset switch SWR1 to close the second reset switch SWR1 to discharge the second capacitor for a sequential charge cycle, such that the amplitude of the second voltage signal decreases from the final second voltage to the initial second voltage. The second switch reset control signal SWCR1 can correspond to the reset signal 134, as illustrated in FIG. 1.

Accordingly, the mode operating logic can be programmed to control the ramp generator 200 to control generation of the buck and boost ramp signals based on the first and second clock signals. The mode operating logic can be programmed to cause the first and second capacitors to establish the first and second voltage signals that can have final respective first and second voltages that are delayed in time with respect to each other. Thus, the first voltage signal can reach the final first voltage one clock cycle of the main clock signal prior to the second voltage signal reaching the final second voltage. Moreover, because the first and second capacitors are reset following each respective clock cycle of a respective first and second clock signal, the initial boost voltage of the boost ramp signal can be similar the final buck voltage of the buck ramp signal.

By way of further example, a boost comparator 218 is configured to receive the boost ramp signal and a buck comparator 220 can be configured to receive the buck ramp signal during each on-period and off-period of the first and second clock signals, respectively. The boost comparator 218 can correspond to the second comparator 142 and the buck comparator 220 can correspond to the first comparator 140, as illustrated in FIG. 1. Each of the boost and buck comparators 218 and 220 can be configured to receive an error signal (labelled as $V_{ERR}$ in FIG. 1 and FIG. 2). The error signal can be generated by an error amplifier circuit (e.g., the error amplifier circuit 144).

The error amplifier circuit can be configured to generate the error signal based on a voltage feedback signal (e.g., the voltage feedback signal $V_{FB}$, as illustrated in FIG. 1) and a reference voltage signal (e.g., the reference voltage $V_{REF}$, as illustrated in FIG. 1). The voltage feedback signal can be based on the output voltage. The reference voltage signal can determine (e.g., define) a target output voltage. Thus, the reference voltage signal can set a target amplitude of the output voltage. The boost comparator 218 can be configured to generate the boost driver signal based on the boost ramp signal and the error signal. The buck comparator 220 can be configured to generate the buck driver signal based on the buck ramp signal and the error signal. The buck and boost driver signals and can be provided to a power stage (e.g., the power stage 138, as illustrated in FIG. 1) of the buck-boost converter to provide the output voltage based on the buck and boost driver signals.

In some examples, the mode operating logic is programmed to cause the buck-boost converter to operate in the buck-boost mode of operation to provide for a smooth transition between the buck and boost operating modes and thus minimize (e.g., reduce) harmonic noise in the output voltage. In the buck-boost mode of operation, the buck-boost converter can be configured to transition a duty cycle of the buck-boost converter from about 100% buck to about 100% boost. In the buck-boost mode of operation, the mode operating logic can be programmed to cause the ramp generator 200 to generate buck and boost ramp signals relative to the error signal that can overlap a percentage in the buck-boost region on alternating clock cycles of the main clock signal. The buck-boost region can correspond to (e.g., be representative of) a buck-boost (or error) voltage range that includes a minimum error voltage and a maximum error voltage.

In the buck-boost mode of operation, the mode operating logic can be programmed to cause the ramp generator 200 to generate the buck ramp signal and the boost ramp signal, such that the ramp signals overlap for a similar amount of time corresponding to a similar percentage (e.g., about 10%) of the buck-boost region during an intermediate clock cycle between clock cycles of the main clock signal. For example, the mode operating logic is programmed to cause the ramp generator 200 to generate the buck ramp signal that overlaps a portion of the buck-boost region during the intermediate clock cycle of the main clock signal. In further examples, the mode operating logic is programmed to cause the ramp generator 200 to generate the boost ramp signal that overlaps a different portion of the buck-boost region during the intermediate clock cycle of the main clock signal.

By way of example, to cause the buck ramp signal to partially overlap the buck-boost region, the mode operating logic is programmed to cause the controller to generate the first and third switch control signals SWC0 and SWC2 during the buck-boost operating mode to cause a positive voltage offset to be applied to the buck ramp signal during the intermediate clock cycle of the main clock signal. The first and third switch control signals SWC0 and SWC2 can be provided to the ramp generator 200 to close the switches SW0 and SW2. The closing of the switches SWC0 and SWC2 of the first switching circuit 202 establishes a fifth current path between the first offset current source 210 and the first capacitor and a sixth current path between third offset current source 214 and the second capacitor.

The first switching circuit 202 can be configured to provide the first current signal to the first capacitor via the first current path and the first offset current signal to the first capacitor via the fifth current path during the intermediate clock cycle of the main clock signal. The first capacitor can be configured to generate the buck ramp signal based on the first current signal and the first offset current signal, such that the buck ramp signal partially overlaps the buck-boost region during an off-period of the intermediate clock cycle of the main clock signal. The addition of the positive voltage offset to the first capacitor via the first offset current signal causes the buck ramp signal to have the final buck voltage that is equal to about the maximum error voltage of the buck-boost region during the off-period of the intermediate clock cycle of the main clock signal. The buck ramp signal partially overlaps the buck-boost region in response to an amplitude of the buck ramp signal increasing over a buck amplitude voltage range that includes the minimum and maximum error voltages of the buck-boost region. Thus, the buck ramp signal partially overlaps the portion of the buck-boost region in response to the amplitude of the buck ramp signal increasing from a corresponding buck voltage to the final buck voltage and decreasing down to the corresponding buck voltage that can be similar to the minimum error voltage during the off-period of the intermediate clock cycle of the main clock signal.

By way of further example, to cause the boost ramp signal to partially overlap the buck-boost region, the mode operating logic is programmed to cause the controller to provide the second and third switch control signals SWC1 and SWC2 to cause a negative voltage offset to be applied to the boost ramp signal during an on-period of the intermediate clock cycle of the main clock signal. The second and third switch control signals SWC1 and SWC2 can be provided to the ramp generator 200 to close the switches SW1 and SW2. The closing of the switches SW1 and SW2 of the first switching circuit 202 establishes a seventh current path between the second offset current source 212 and the second capacitor and an eight current path between the fourth offset current source 216 and the first capacitor. The first switching circuit 202 can be configured to provide the second current signal via the second current path to the first capacitor and the fourth offset current signal via the eight current path to the first capacitor.

The first capacitor can be configured to generate the boost ramp signal based on the second current signal and the fourth offset current signal, such that the boost ramp signal partially overlaps the buck-boost region during an on-period of the intermediate clock cycle of the main clock signal. The addition of the negative voltage offset to the first capacitor via the fourth offset current signal causes the boost ramp signal to have the initial boost voltage that is about equal to the minimum error voltage of the buck-boost region during the on-period of the intermediate clock cycle of the main clock signal. The boost ramp signal partially overlaps the buck-boost region in response to an amplitude of the boost ramp signal decreasing over a boost amplitude voltage range that includes the minimum and maximum error voltages of the buck-boost region. Thus, the boost ramp signal partially overlaps the buck-boost region in response to the amplitude of the boost ramp signal decreasing from a corresponding boost voltage to the minimum boost voltage and increasing back to the corresponding boost voltage similar to the maximum error voltage during the on-period of the first clock signal and the off-period of the second clock signal.

By way of example, during a sequential clock cycle to the intermediate clock cycle of the main clock signal, the mode operating logic is programmed to cause the controller to provide the second and third switch control signals SWC1 and SWC2 to cause a negative voltage offset to be applied to the buck ramp signal. The second and third switch control signals SWC1 and SWC2 can be provided to the ramp generator 200 to close the switches SW1 and SW2. The closing of the switches SW1 and SW2 establishes the seventh current path between the second offset current source 212 and the second capacitor and the eight current path between the fourth offset current source 216 and the first capacitor. The first switching circuit 202 can be configured to provide the first current signal via the third current path to the second capacitor and the second offset current signal via the seventh current path to the second capacitor. The second capacitor can be configured to generate the buck ramp signal based on the first current signal and the second offset current signal during the sequential clock cycle of the main clock signal, such that the buck ramp signal does not partially overlap the buck-boost region. The addition of the negative voltage offset to the second capacitor via the second offset current signal during the sequential clock cycle of the main clock signal causes the buck ramp signal to have the final buck voltage that is equal to about the minimum error voltage of the buck-boost region. Thus, the mode operating logic can be programmed to cause the ramp generator 200 to generate the buck ramp signal during the sequential clock cycle of the main clock signal, such that buck ramp signal does not partially overlap the buck-boost region corresponding to increasing the amplitude of the buck ramp signal to the final buck voltage that is equal to about the minimum error voltage of the buck-boost region.

By way of further example, during the sequential clock cycle to the intermediate clock cycle of the main clock signal, the mode operating logic is programmed to cause the controller to provide the first switch control signal SWC0 and the third switch control signal SWC2 to cause a positive voltage offset to be applied to the boost ramp signal. The second and third switch control signals SWC1 and SWC2 can be provided to the ramp generator 200 to close the switches SW1 and SW2. The first switching circuit 202 can be configured to provide the second current signal via the fourth current path to the first capacitor and the fourth offset current signal via the eight current path to the first capacitor. The first capacitor can be configured to generate the boost ramp signal based on the second current signal and the fourth offset current signal, such that boost ramp signal does not partially overlap the buck-boost region (e.g., during the off-period of the sequential clock signal). The addition of the positive voltage offset to the first capacitor via the fourth offset current signal causes the boost ramp signal to have the initial boost voltage that is equal to about the maximum error voltage of the buck-boost region. Thus, the mode operating logic can be programmed to cause the ramp generator 200 to generate the boost ramp signal during the sequential clock cycle to the intermediate clock cycle of the main clock signal, such that the boost ramp signal does not partially overlap the buck-boost region corresponding to increasing the amplitude of the boost ramp signal from the initial boost voltage that is equal to about the maximum error voltage of the buck-boost region to the final boost voltage over the second clock cycle of the main clock signal.

Accordingly, by causing the boost and buck ramp signals to partially overlap the buck-boost region, the buck and boost driver signals can activate corresponding switches (e.g., a select switch of the first and second set of switches 148 and 150, as illustrated in FIG. 1) in an alternating manner during each intermediate clock cycle between clock cycles of the main clock signal, such that the output voltage can be averaged out in the buck-boost region. The averaging of the output voltage reduces errors in the output voltage, such that in response to the buck-boost converter transitioning from the buck-boost mode of operation to the boost mode of operation harmonics the output voltage resulting from switching operating modes is reduced. Thus, the mode operating logic can be programmed to enable the buck-boost converter to smoothly transition between buck and boost operating modes.

Figure 3:
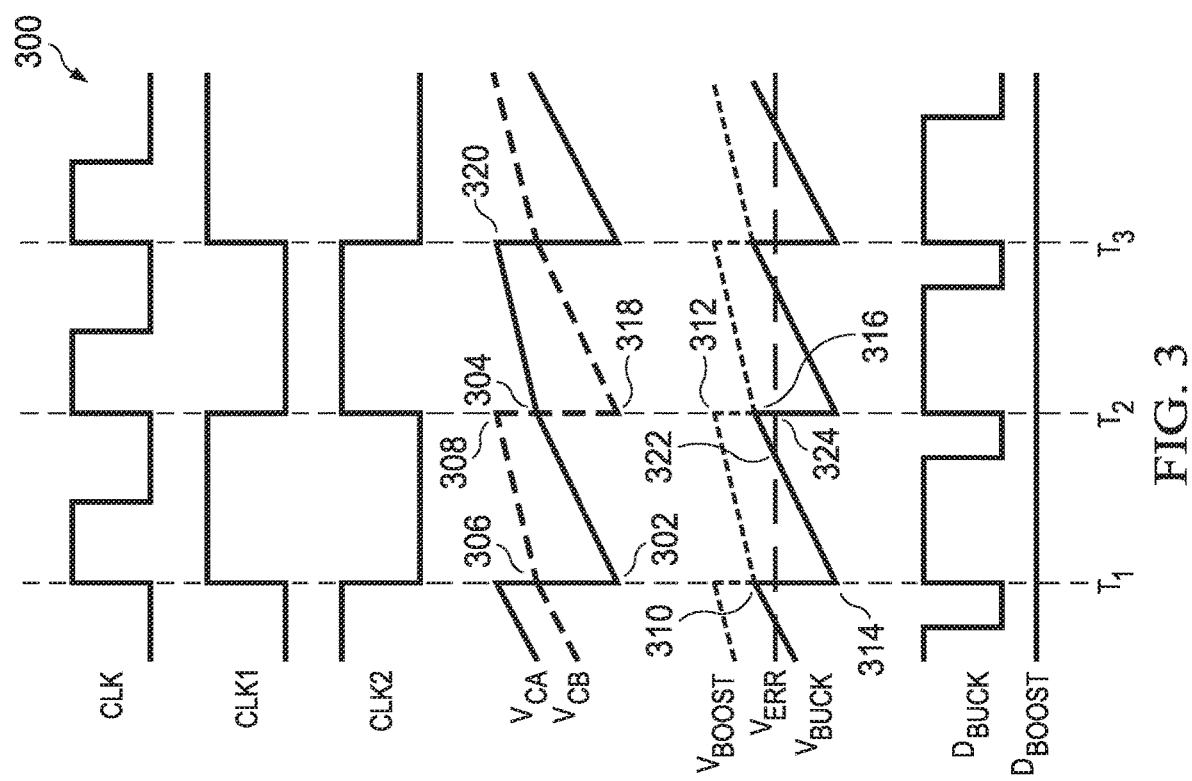
FIG. 3 illustrates an example of waveform diagrams for a buck-boost converter operating in a buck mode.

FIG. 3 illustrates an example of waveform diagrams 300 for a buck-boost converter operating in a buck mode. The waveform diagrams 300 can be associated with operation of the buck-boost converter 100, as illustrated in FIG. 1 or the ramp generator 200, as illustrated in FIG. 2. Therefore, reference may be made to the example of FIGS. 1 and 2 in the following description of the example of FIG. 3. By way of example, the waveform diagrams 300 include a main clock signal, CLK, a first clock signal, CLK1, a second clock signal, CLK2, a first voltage signal, $V_{C4}$, a second voltage signal, $V_{CB}$, a buck ramp voltage signal, $V_{BUCK}$, a boost ramp voltage signal, $V_{BOOST}$, a buck driver signal, $D_{BUCK}$, and a boost driver signal, $D_{BOOST}$. In the example of FIG. 3, the buck-boost converter is configured to operate in the buck mode, such that the boost driver can have a logical low (e.g., is about 0V).

By way of example, at about a start of a first clock cycle of the main clock signal (occurring at about a time $T_1$), mode operation logic (e.g., the mode operating logic 104) is programmed to detect a rising edge of the first clock signal and generate a first switching control signal (e.g., the first switch control signal 112, as illustrated in FIG. 1). The first switching control signal can be provided to a first switching circuit (e.g., the first switching circuit 118, as illustrated in FIG. 1). The first switching circuit can be configured to supply a first current signal (e.g., the first current signal $I_1$, as illustrated in FIG. 1) from a first current source (e.g., the first current source 124, as illustrated in FIG. 1) to a first storage circuit (e.g., the first storage circuit 120, as illustrated in FIG. 1) in response to the first switch control signal. The first switching circuit is further configured to supply a second current signal (e.g., the second current signal 12, as illustrated in FIG. 1) from a second current source (e.g., the second current source 126, as illustrated in FIG. 1) to a second storage circuit (e.g., the second storage circuit 122, as illustrated in FIG. 1) in response to the first switch control signal.

Between the time $T_1$ and time $T_2$, the first storage circuit can be configured to store a charge during an on-period (e.g., a logical HIGH, as illustrated in FIG. 3) of the first clock signal to provide the first voltage signal. The first voltage signal can increase from an initial first voltage 302 to an intermediate first voltage 304 that is greater than the initial first voltage 302 during the on-period of the first clock signal. In some examples, between the time $T_1$ and time $T_2$, the second storage circuit is configured to store a charge during the on-period of the first clock signal to provide the second voltage signal. The second voltage signal can increase from an intermediate second voltage 306 to a final second voltage 308 that is greater than the intermediate second voltage 306 during the on-period of the first clock signal.

As the first and second storage circuits store charge based on corresponding current signals, ramp signals can be generated. By way of example, between the time $T_1$ and time $T_2$, the amplitude of the boost ramp signal increases proportional to the charge stored at the second storage circuit, and thus based on the second voltage signal. During the on-period of the first clock signal, the amplitude of the boost ramp signal can increase from an initial boost voltage 310 to a final boost voltage 312 that is greater than the initial boost voltage 310 as the first current signal charges the first storage circuit. In some examples, between the time $T_1$ and time $T_2$, the amplitude of the buck ramp signal increases proportional to the charge stored at the first storage circuit, and thus based on the first voltage signal. During the on-period of the first clock signal, the amplitude of the buck ramp signal can increase from an initial buck voltage 314 to a final buck voltage 316 that is greater than the initial buck voltage as the first current signal charges the first storage circuit.

In some examples, a second switching circuit (e.g., the second switching circuit 130, as illustrated in FIG. 1) is configured to provide the boost ramp signal based on the second voltage signal and the buck ramp signal based on the first voltage signal in response to the first switch control signal. At about the time $T_2$, the first clock signal can transition to an off-period (e.g., a logical LOW, as illustrated in FIG. 3). The mode operation logic can be programmed to detect a rising edge of the second clock signal and output a second reset signal (e.g., the reset signal 132, as illustrated in FIG. 1). The second reset signal can be provided to the second storage circuit to discharge the second storage circuit for a sequential charge cycle, such that the amplitude of the second voltage signal decreases from the final second voltage 308 to an initial second voltage 318. By way of example, at about a time $T_2$ at a start of a second clock cycle of the main clock signal, the mode operation logic is programmed to detect a rising edge of the second clock signal and generate a second switch control signal (e.g., the second switch control signal 114, as illustrated in FIG. 1).

In some examples, during the on-period of the second clock signal, the second switch control signal is provided to the first switching circuit. The first switching circuit is configured to supply the first current signal to the second storage circuit in response to the first switch control signal in response to the second switch control signal. The first switching circuit is further configured to supply the second current signal to the first storage circuit in response to the second switch control signal. Between the time $T_2$ and time $T_3$, the first storage circuit can be configured to store additional charge during the on-period of the second clock signal to increase the first voltage signal from the intermediate first voltage 304 to a final first voltage 320 based on the charge stored at the first storage circuit according to the second current signal. Thus, between the time $T_2$ and time $T_3$, the first voltage signal can increase from the intermediate first voltage 304 to the final first voltage 320 that is greater than the intermediate first voltage 304 during the on-period of the second clock signal. In some examples, between the time $T_2$ and time $T_3$, the second storage circuit is configured to store a charge during the on-period of the second clock signal to provide the second voltage signal based on the charge stored at the second storage circuit according to the first current signal. The second voltage signal can increase from the initial second voltage 318 to the intermediate second voltage 306 that is greater than the initial second voltage 318 during the on-period of the second clock signal.

In some examples, between the time $T_1$ and time $T_2$, the buck and boost ramp signals are provided with amplitudes that increase from initial voltages 310 and 314 to final voltages 312 and 316. During each clock cycle of the main clock, for example, between the time $T_1$ and the time $T_2$, and the time $T_2$ and the time $T_3$, an error amplifier circuit (e.g., the error amplifier circuit 144, as illustrated in FIG. 1) is configured to compare a feedback voltage (e.g., the feedback voltage $V_{FB}$, as illustrated in FIG. 1) that is based on a portion of an output voltage (e.g., the output voltage $V_{OUT}$, as illustrated in FIG. 1) and a reference voltage (e.g., the reference voltage signal $V_{REF}$, as illustrated in FIG. 1).

The error amplifier circuit is configured to output an error signal (e.g., the error signal $V_{ERR}$, as illustrated in FIG. 1) based on the comparison. In some examples, such as during buck mode, the error signal (labelled as $V_{ERR}$ in the example of FIG. 3) intersects the buck ramp signal, as illustrated in FIG. 3 with a dashed line. An intersection of the error signal with the buck ramp signal in the example of FIG. 3 can be indicative of an amplitude of the error signal being equal to the amplitude of the buck ramp signal at an instance of time. The buck-boost converter can be configured to generate the buck driver signal with a duty cycle (e.g., a pulse width) based on respective timing intersections of the error signal and the buck ramp signal during each clock cycle of the main clock signal. For example, during a first clock cycle of the main clock signal, the buck ramp signal intersects the error signal at a first cross point 322 and a second cross point 324. A duration of time between the first cross point 322 and the second cross point 324 can define (e.g., determine) the pulse width of the buck driver signal. Accordingly, the error signal can vary the duty cycle between 0% to about 100% of the buck driver signal during the buck operating mode of the buck-boost converter based on the cross points during each clock cycle of the main clock signal. At about the time $T_3$, the second clock signal can transition to an off-period (e.g., a logical LOW, as illustrated in FIG. 3). The mode operation logic can be programmed to detect a rising edge of the first clock and output a first reset signal (e.g., the reset signal 132, as illustrated in FIG. 1). The first reset signal can be provided to the first storage circuit to discharge the first storage circuit for a sequential charge cycle, such that the amplitude of the first voltage signal decreases from about the final first voltage 320 to about the initial first voltage 302.

Figure 4:
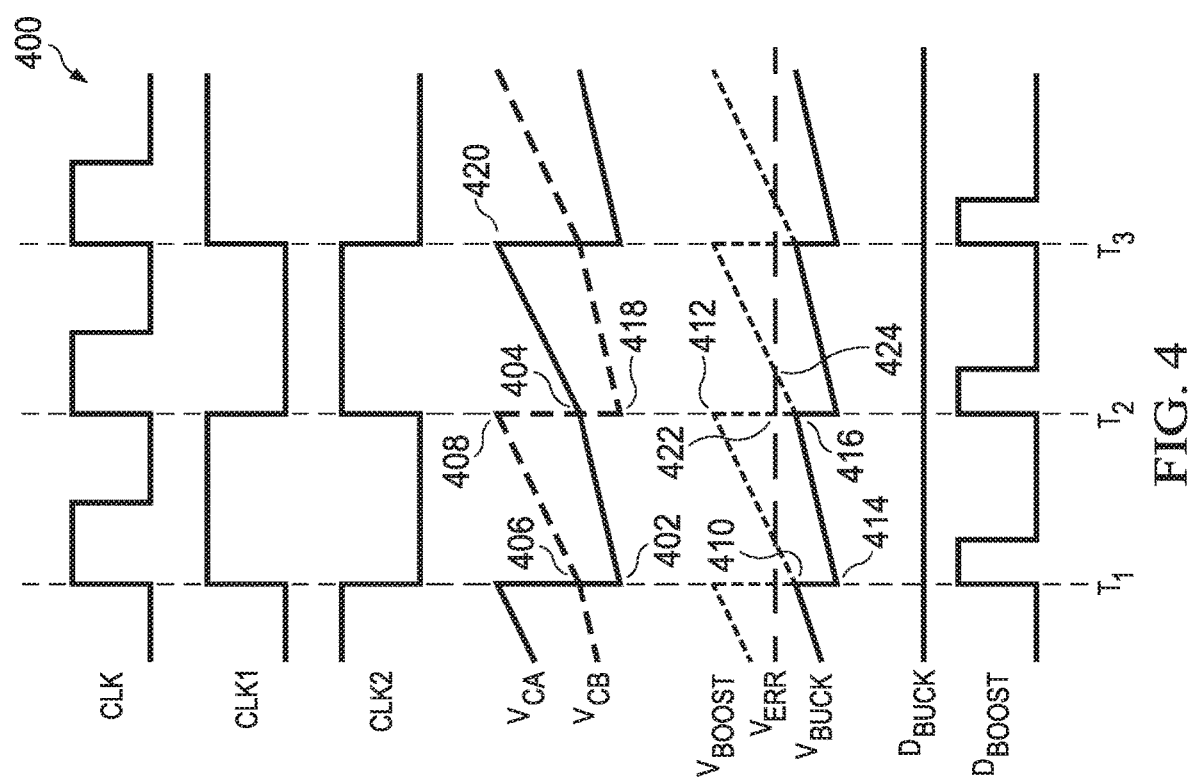
FIG. 4 illustrates an example of waveform diagrams for a buck-boost converter operating in a boost mode.

FIG. 4 illustrates an example of waveform diagrams 400 for a buck-boost converter operating in a boost mode. The waveform diagrams 400 can be associated with operation of the buck-boost converter 100, as illustrated in FIG. 1 or the ramp generator 200, as illustrated in FIG. 2. Therefore, reference may be made to the example of FIGS. 1 and 2 in the following description of the example of FIG. 4. By way of example, the waveform diagrams 400 include a main clock signal, CLK, a first clock signal, CLK1, a second clock signal, CLK2, a first voltage signal, $V_{CA}$, a second voltage signal, $V_{CB}$, a buck ramp voltage signal, $V_{BUCK}$, a boost ramp voltage signal, $V_{BOOST}$, a buck driver signal, $D_{BUCK}$, and a boost driver signal, $D_{BOOST}$. In the example of FIG. 4, the buck-boost converter is configured to operate in the boost mode, such that the buck driver can have a logical low (e.g., is about 0V).

By way of example, at about a start of a first clock cycle of the main clock signal (at about a time $T_1$), mode operation logic (e.g., the mode operating logic 104) is programmed to detect a rising edge of the first clock signal and generate a first switching control signal (e.g., the first switching control signal 112, as illustrated in FIG. 1). The first switching control signal can be provided to a first switching circuit (e.g., the first switching circuit 118, as illustrated in FIG. 1). The first switching circuit can be configured to supply a first current signal (e.g., the first current signal $I_1$, as illustrated in FIG. 1) from a first current source (e.g., the first current source 124, as illustrated in FIG. 1) to a first storage circuit (e.g., the first storage circuit 120, as illustrated in FIG. 1) in response to the first switch control signal. The first switching circuit is further configured to supply a second current signal (e.g., the second current signal 12, as illustrated in FIG. 1) from a second current source (e.g., the second current source 126, as illustrated in FIG. 1) to a second storage circuit (e.g., the second storage circuit 122, as illustrated in FIG. 1) in response to the first switch control signal.

Between the time $T_1$ and time $T_2$, the first storage circuit can be configured to store a charge during an on-period (e.g., a logical HIGH, as illustrated in FIG. 4) of the first clock signal to provide the first voltage signal according to the first current signal. The first voltage signal can increase from an initial first voltage 402 to an intermediate first voltage 404 that is greater than the initial first voltage 402 during the on-period of the first clock signal. In some examples, between the time $T_1$ and time $T_2$, the second storage circuit is configured to store a charge during the on-period of the first clock signal to provide the second voltage signal based on the charge stored at the second storage circuit according to the second current signal. The second voltage signal can increase from an intermediate second voltage 406 to a final second voltage 408 that is greater than the intermediate second voltage 406 during the on-period of the first clock signal.

In some examples, as the first and second storage circuits store charge based on corresponding current signals, ramp signals can be generated. By way of example, between the time $T_1$ and time $T_2$, the amplitude of the boost ramp signal increases proportional to the charge stored at the second storage circuit, and thus based on the second voltage signal. During the on-period of the first clock signal, the amplitude of the boost ramp signal can increase from an initial boost voltage 410 to a final boost voltage 412 that is greater than the initial boost voltage 410 as the first current signal charges the first storage circuit. In some examples, between the time $T_1$ and time $T_2$, the amplitude of the buck ramp signal increases proportional to the charge stored at the first storage circuit, and thus based on the second voltage signal. During the on-period of the first clock signal, the amplitude of the buck ramp signal can increase from an initial buck voltage 414 to a final buck voltage 416 that is greater than the initial buck voltage 414 as the first current signal charges the first storage circuit.

In some examples, a second switching circuit (e.g., the second switching circuit 130, as illustrated in FIG. 1) is configured to provide to respective comparators (e.g., the first and second comparators 140 and 142, as illustrated in FIG. 1) the boost ramp signal based on the second voltage signal and the buck ramp signal based on the first voltage signal in response to the first switch control signal. At about the time $T_2$, the first clock signal can transition to an off-period (e.g., a logical LOW, as illustrated in FIG. 4). The mode operation logic can be programmed to detect a rising edge of the second clock signal and output a second reset signal (e.g., the reset signal 134, as illustrated in FIG. 1). The second reset signal can be provided to the second storage circuit to discharge the second storage circuit for a sequential charge cycle, such that the amplitude of the second voltage signal decreases from the final second voltage 408 to an initial second voltage 418 that is less than the final second voltage 408. By way of example, at about a time $T_2$ at a start of a second clock cycle of the main clock signal, the mode operation logic is programmed to detect a rising edge of the second clock signal and generate a second switch control signal (e.g., the second switch control signal 114, as illustrated in FIG. 1).

In some examples, during the on-period of the second clock signal, the second switch control signal is provided to the first switching circuit. The first switching circuit is configured to supply the first current signal to the second storage circuit in response to the first switch control signal in response to the second switch control signal. The first switching circuit is further configured to supply the second current signal to the first storage circuit in response to the second switch control signal. Between the time $T_2$ and time $T_3$, the first storage circuit can be configured to store additional charge during the on-period of the second clock signal to increase the first voltage signal from the intermediate first voltage 404 to a final first voltage 420 based on the charge stored at the first storage circuit according to the second current signal. Thus, between the time $T_2$ and time $T_3$, the first voltage signal can increase from the intermediate first voltage 404 to the final first voltage 420 that is greater than the intermediate first voltage 404 during the on-period of the second clock signal. In some examples, between the time $T_2$ and time $T_3$, the second storage circuit is configured to store a charge during the on-period of the second clock signal to provide the second voltage signal based on the charge stored at the second storage circuit according to the first current signal. The second voltage signal can increase from the initial second voltage 418 to the intermediate second voltage 406 that is greater than the initial second voltage 418 during the on-period of the second clock signal.

In some examples, between the time $T_1$ and time $T_2$, the buck and boost ramp signals are provided with amplitudes that increase from initial voltages 410 and 414 to final voltages 412 and 416. During each clock cycle of the main clock, for example, between the time $T_1$ and time $T_2$, and the time $T_2$ and time $T_3$, an error amplifier circuit (e.g., the error amplifier circuit 144, as illustrated in FIG. 1) can be configured to compare a feedback voltage (e.g., the feedback voltage $V_{FB}$, as illustrated in FIG. 1) that is based on a portion of an output voltage (e.g., the output voltage $V_{OUT}$, as illustrated in FIG. 1) and a reference voltage (e.g., the reference voltage signal $V_{REF}$, as illustrated in FIG. 1).

The error amplifier circuit is configured to output an error signal (e.g., the error signal $V_{ERR}$, as illustrated in FIG. 1) based on the comparison. In some examples, such as during the boost mode, the error signal (illustrated in the example of FIG. 4 with a dashed line) intersects the boost ramp signal. An intersection of the error signal with the boost ramp signal in the example of FIG. 4 can be indicative of the amplitude of the error signal being equal to the amplitude of the boost ramp signal at an instance of time. The buck-boost converter can be configured to generate the boost driver signal with a duty cycle (e.g., a pulse width) based on respective timing intersections of the error signal and the boost ramp signal during each clock cycle of the main clock signal. For example, during a first clock cycle of the main clock signal, the boost ramp signal intersects the error signal at a first cross point 422 and a second cross point 424. A duration of time between the first cross point 422 and the second cross point 424 can define (e.g., determine) the pulse width of the boost driver signal during each clock cycle of the main clock signal. At about the time $T_3$, the second clock signal can transition to an off-period (e.g., a logical LOW, as illustrated in FIG. 4).

The mode operation logic can be programmed to detect a rising edge of the first clock signal and output a first reset signal (e.g., the reset signal 132, as illustrated in FIG. 1). The first reset signal can be provided to the first storage circuit to discharge the first storage circuit for a sequential charge cycle, such that the amplitude of the first voltage signal decreases from about the final first voltage 420 to about the initial first voltage 402. In some examples the rising edge of a sequential first clock signal can be used to generate the second reset signal. Accordingly, the error signal can vary the duty cycle between 0% to about 100% of the boost driver signal during the boost operating mode of the buck-boost converter based on the cross points during each clock cycle of the main clock signal.

Figure 5:
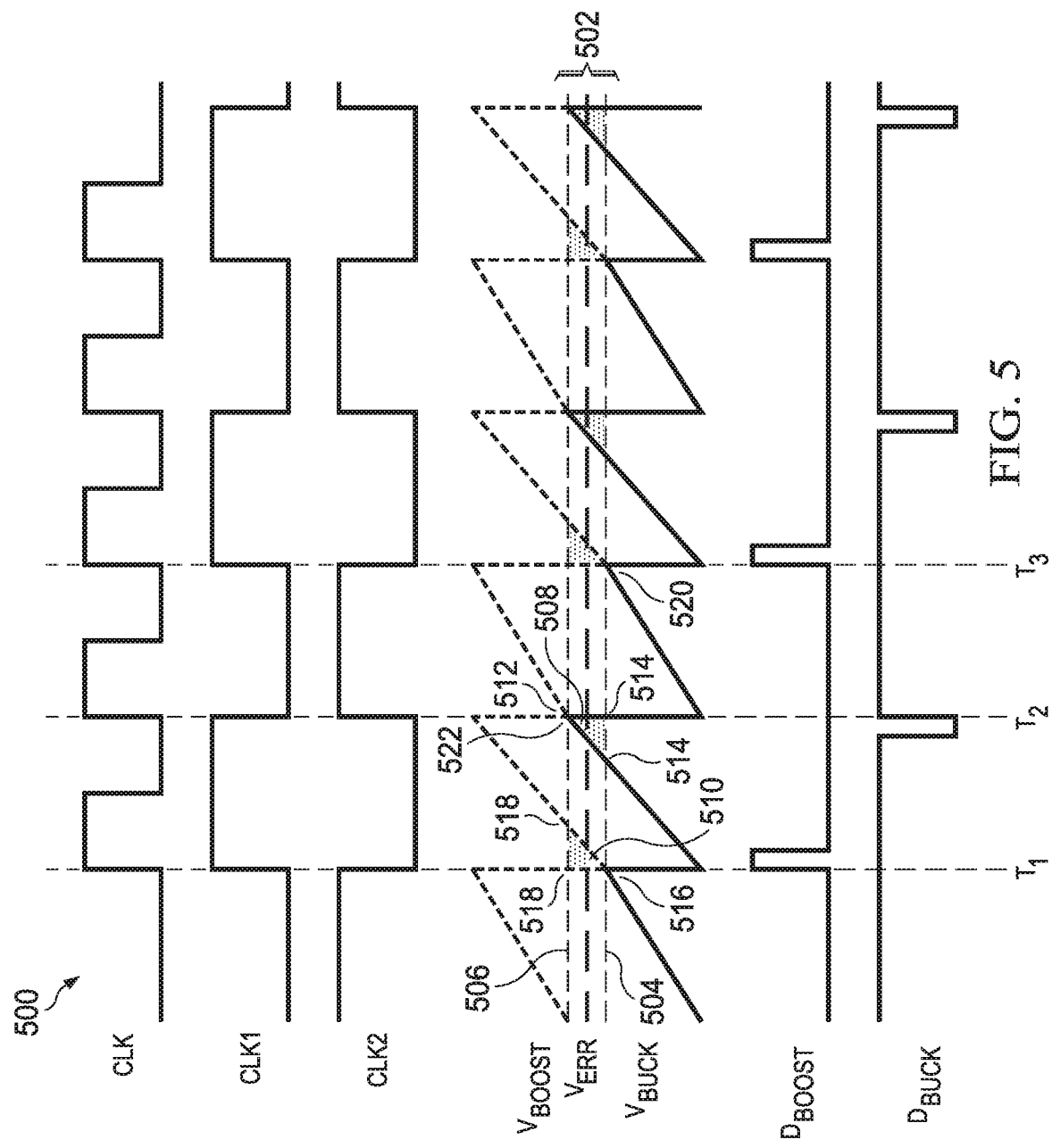
FIG. 5 illustrates an example of waveform diagrams for a buck-boost converter operating in a buck-boost mode.

FIG. 5 illustrates an example of waveform diagrams 500 for a buck-boost converter operating in a buck-boost mode. The waveform diagrams 500 can be associated with operation of the buck-boost converter 100, as illustrated in FIG. 1 or the ramp generator 200, as illustrated in FIG. 2. Therefore, reference may be made to the example of FIGS. 1 and 2 in the following description of the example of FIG. 5. By way of example, the waveform diagrams 500 include a main clock signal, CLK, a first clock signal, CLK1, a second clock signal, CLK2, a buck ramp voltage signal, $V_{BUCK}$, a boost ramp voltage signal $V_{BOOST}$, a buck driver signal, $D_{BUCK}$, and a boost driver signal, $D_{BOOST}$. In the buck-boost mode of operation, mode operating logic (e.g., the mode operating logic 104, as illustrated in FIG. 1) can be programmed to cause a controller (e.g., the controller 102, as illustrated in FIG. 1) to generate buck and boost ramp signals based on an error voltage (e.g., the error signal $V_{ERR}$, as illustrated in FIGS. 1 and 5) that can overlap a percentage in a buck-boost region 502 during each intermediate clock cycle between clock cycles of the main clock signal. In some examples, the buck-boost region can correspond to (e.g., be representative of) a buck-boost voltage range that is bounded by a minimum error voltage 504 and a maximum error voltage 506.

In the buck-boost mode of operation, the mode operating logic can be programmed to cause a ramp generator (e.g., the ramp generator 108, as illustrated in FIG. 1 or the ramp generator 200, as illustrated in FIG. 2) of the buck-boost converter to generate the buck ramp signal and boost ramp signal, such that these respective signals overlap for a similar amount of time corresponding to a similar region percentage (e.g., about 10%) of the buck-boost region 502 on alternating clock cycles of the main clock signal. For example, the mode operating logic can be programmed to cause the ramp generator to generate the buck ramp signal, such that the buck ramp signal overlaps a portion 508 of the buck-boost region 502 during a respective clock cycle of the main clock signal. In further examples, the mode operating logic can be programmed to cause the ramp generator to generate the boost ramp signal, such that the boost ramp signal overlaps a portion 510 of the buck-boost region 502 during the respective clock cycle of the main clock signal.

By way of example, the mode operating logic is programmed to cause the controller to generate, such as during an on-period of the first clock signal and an off-period of the second clock signal, a first switch control signal (e.g., the first switch control signal SWC0, as illustrated in FIG. 2) and a third switch control signal (e.g., the third switch control signal SWC2, as illustrated in FIG. 2). The first and third switch control signal can be provided to a switching circuit (e.g., the first switching circuit 202, as illustrated in FIG. 2) to cause switches (e.g., the switches SW0, SW2, as illustrated in FIG. 2) to close to add a positive voltage offset to the buck ramp signal generated during the on-period of the first clock signal and the off-period of a second clock signal. The first and second switch control signals can be provided to the first switching circuit, such as between time $T_1$ and time $T_2$ corresponding to the on-period of the first clock signal and the off-period of the second clock signal. The first switching circuit can be configured to provide a first offset current signal (e.g., the third offset current signal $I_{OC3}$, as illustrated in FIG. 2) and a first current signal (e.g., the second current signal 12, as illustrated in FIG. 2) to a second storage circuit (e.g., the capacitor C2, as illustrated in FIG. 2) in response to the first and third control signals between the time $T_1$ and the time $T_2$, as illustrated in FIG. 5. The second storage circuit can be configured to provide the buck ramp signal, such that the buck ramp signal partially overlaps the portion 508 of the buck-boost region 502 during this clock cycle of the main clock signal. The addition of the positive voltage offset to the second storage circuit via the first offset current signal causes the buck ramp signal to have a final buck voltage 512 at about time $T_2$ that is about equal to the maximum error voltage 506 of the buck-boost region 502.

The buck ramp signal partially overlaps the buck-boost region 502 in response to the amplitude of the buck ramp signal increasing over a buck amplitude voltage range that includes the minimum error voltage 504 and maximum error voltage 506 of the buck-boost region 502. Thus, the buck ramp signal partially overlaps the portion 508 of the buck-boost region 502 during this cycle of the main clock signal in response to the amplitude of the buck ramp signal increasing from a buck voltage 514 to the final buck voltage 512 and decreasing down to the buck voltage 514 similar to the minimum error voltage 504 between the time $T_1$ and the time $T_2$.

By way of example, the mode operating logic is programmed to cause the controller to generate during the on-period of the first clock signal and the off-period of the second clock signal a second switch control signal (e.g., the second switch control signal SWC1, as illustrated in FIG. 2) and the third switch control signal (e.g., the third switch control signal SWC2, as illustrated in FIG. 2). The second and third switch control signal can be provided to the switching circuit to cause switches (e.g., the switches SW1 and SW2, as illustrated in FIG. 2) to close to add a negative voltage offset to the boost ramp signal generated during the off-period of a first clock signal and the on-period of the second clock signal. The second and third switch control signals can be provided to the first switching circuit, such as between time $T_1$ and time $T_2$ corresponding to the on-period of the first clock signal and the off-period of the second clock signal. The first switching circuit can be configured to provide a second offset current signal (e.g., the second offset current signal $I_{OC2}$, as illustrated in FIG. 2) and a second current signal (e.g., the first current signal $I_1$, as illustrated in FIG. 2) to a first storage circuit (e.g., the capacitor C1, as illustrated in FIG. 2) in response to the second and third switches. The first storage circuit can be configured to generate the boost ramp signal, such that the boost ramp signal partially overlaps the buck-boost region 502 (e.g., during the intermediate clock cycle of the clock signal).

The addition of the negative voltage offset to the first storage circuit via the second offset current signal causes the boost ramp signal to have a minimum boost voltage 516 at about time $T_1$ that is about equal to the minimum error voltage 504 of the buck-boost region 502. The boost ramp signal partially overlaps the buck-boost region 502 in response to the amplitude of the boost ramp signal decreasing over a boost amplitude voltage range that includes the minimum and maximum error voltages 504 and 506 of the buck-boost region 502 between the time $T_1$ and the time $T_2$. Thus, the boost ramp signal partially overlaps the buck-boost region 502 in response to the amplitude of the boost ramp signal decreasing from a boost voltage 518 to the minimum boost voltage 516 and increasing back to the boost voltage 518 similar to the maximum error voltage 506 between the time $T_1$ and the time $T_2$.

In some examples, between the time $T_2$ and a time $T_3$, such as during the off-period of the first clock signal and the on-period of the second clock signal for an intermediate clock cycle of the main clock signal, the mode operating logic is programmed to cause the controller to generate the second and third switch control signals. The second and third switch control signals can be provided to the switching circuit to cause switches (e.g., the switches SW1 and SW2, as illustrated in FIG. 2) to close to add a negative voltage offset to the buck ramp signal generated during the off-period of the first clock signal and the on-period of the second clock signal. The first switching circuit can be configured to provide a third offset current signal and the first current signal to the second storage circuit in response to the second and third switch control signals between the time $T_2$ and the time $T_3$.

The second storage circuit can be configured to generate the buck ramp signal based on the third offset current signal and the first current signal between the time $T_2$ and the time $T_3$, such that the buck ramp signal does not partially overlap the buck-boost region 502 (e.g., during the off-period of the sequential clock signal). The addition of the negative voltage offset to the second storage circuit via third offset current signal causes the buck ramp signal to have a final buck voltage 520 at about time $T_3$ that is equal to about the minimum error voltage 504 of the buck-boost region 502. Thus, the mode operating logic can be programmed to cause the ramp generator to generate the buck ramp signal between the time $T_2$ and the time $T_3$, such that the buck ramp signal does not partially overlap the buck-boost region 502 corresponding to generating the buck ramp signal having the final buck voltage 520 that is about equal the minimum error voltage 504 of the buck-boost region 502.

In some examples, between time $T_2$ and time $T_3$ (corresponding to the off-period of the first clock signal and the on-period of the second clock signal), the mode operating logic is programmed to cause the controller to generate the first and third switch control signal to add a positive voltage offset to the boost ramp signal. The first and third switch signals can be provided to the first switching circuit between the time $T_2$ and the time $T_3$. The first switching circuit can be configured to provide a fourth offset current signal (e.g., the fourth offset current signal $I_{OC4}$, as illustrated in FIG. 2) and the second current signal to the first storage circuit in response to the first and third switches between the time $T_2$ and the time $T_3$. The first storage circuit can be configured to generate the boost ramp signal based on the first current signal and the fourth offset current signal between the time $T_2$ and the time $T_3$, such that the boost ramp signal does not partially overlap the buck-boost region 502 (e.g., during the on-period of the sequential clock signal). The addition of the positive voltage offset to the first storage circuit via the fourth offset current signal causes the boost ramp signal to have a minimum boost voltage 522 at about time $T_2$ that is equal to about the maximum error voltage 506 of the buck-boost region 502. Thus, the mode operating logic can be programmed to cause the ramp generator to generate the boost ramp signal between the time $T_2$ and the time $T_3$, such that the boost ramp signal does not partially overlap the buck-boost region 502 corresponding to generating the boost ramp signal with the minimum boost voltage 522 at about time $T_2$ that is about equal to about the maximum error voltage 506.

Accordingly, the mode operating logic can be programmed to cause the ramp generator to generate buck and boost ramp signals that partially overlap different portions 508 and 510 of the buck-boost region 502 during alternative clock cycles of the main clock signal during the buck-boost mode of operation. In some examples, the mode operating logic is programmed to cause the ramp generator to generate buck and boost ramp signals, such that the buck and boost driver signals have similar pulse widths during each alternative clock cycle of the main clock signal. The buck and boost driver signals can be received at a power stage (e.g., the power stage 138, as illustrated in FIG. 1) and applied to switches (e.g., select switches of the first and second set of switches 148 and 150, as illustrated in FIG. 1) in an alternating manner to toggle the buck-boost converter between the buck mode and the boost mode during each intermediate clock cycle between clock cycles of the main clock signal. By toggling the buck and boost switches alternatively during each intermediate clock cycle of the clock signal, an output voltage (e.g., the output voltage $V_{OUT}$, as illustrated in FIG. 1) provided by the buck-boost converter can be averaged. The averaging of the output voltage can reduce harmonics in the output voltage, such that in response to the buck-boost converter transitioning from the buck-boost mode of operation to the boost mode of operation the harmonics in the output voltage resulting from switching operating modes is reduced. Thus, the mode operating logic can be programmed to enable the buck-boost converter to smoothly transition between buck and boost operating modes.

Figure 6:
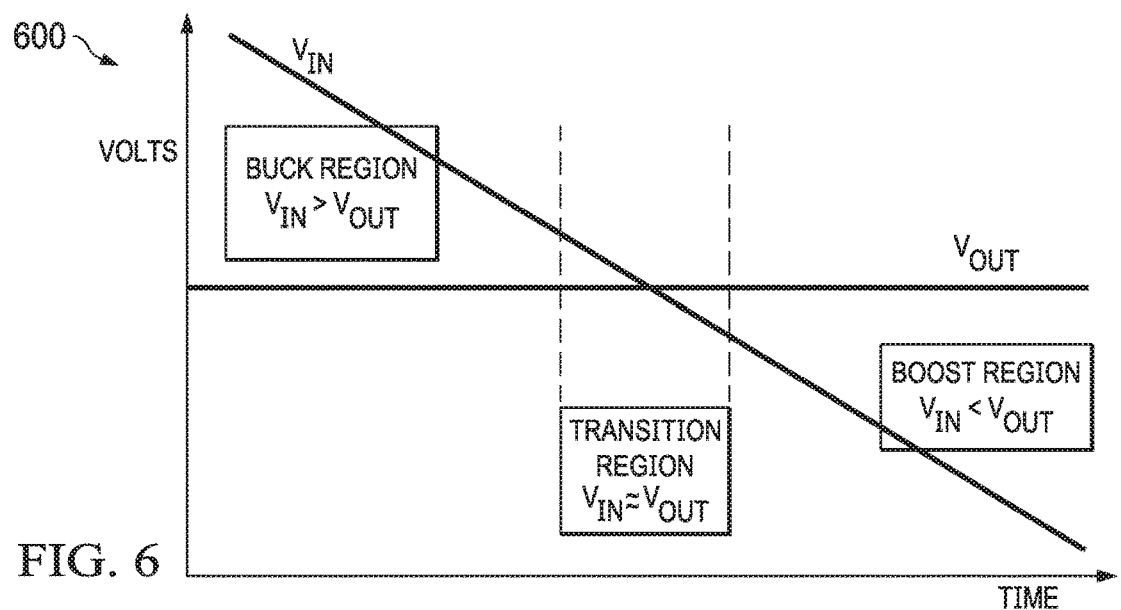
FIG. 6 illustrates an example diagram of modes of operation of a buck-boost converter.

FIG. 6 illustrates an example diagram 600 of modes of operation of a buck-boost converter. In some examples, the buck-boost converter is the buck-boost converter 100, as illustrated in FIG. 1. Therefore, reference may be made to the example of FIGS. 1-5 in the following description of the example of FIG. 6. As illustrated in the example of FIG. 6, a vertical axis of the diagram 600 represent a voltage in volts (V) and a horizontal axis of the diagram 600 can represent time in a time value (e.g., milliseconds (ms), etc.). The diagram 600 plots an input voltage $V_{IN}$ (e.g., the input voltage $V_{IN}$, as illustrated in FIG. 1) received at the buck-boost converter and the output voltage $V_{OUT}$ (e.g., the output voltage $V_{OUT}$, as illustrated in FIG. 1) from the buck-boost converter. In some examples, the buck-boost converter is configured to operate in the buck mode when the input voltage $V_{IN}$ is greater than the output voltage $V_{OUT}$, illustrated in the diagram 600 in a buck region as $V_{IN} > V_{OUT}$ at the left side of the diagram 600. In some examples, the buck-boost converter can be configured to operate in the boost mode when the input voltage is less than the output voltage, shown as $V_{IN} < V_{OUT}$ at the right side of the diagram 600. In some examples, the buck-boost converter is configured to operate in a transition region corresponding to the buck-boost region when the input voltage $V_{IN}$ is approximately equal to, or close, to the output voltage $V_{OUT}$, illustrated in the diagram 600 in the transition region in the middle of the diagram 600.

Figure 7:
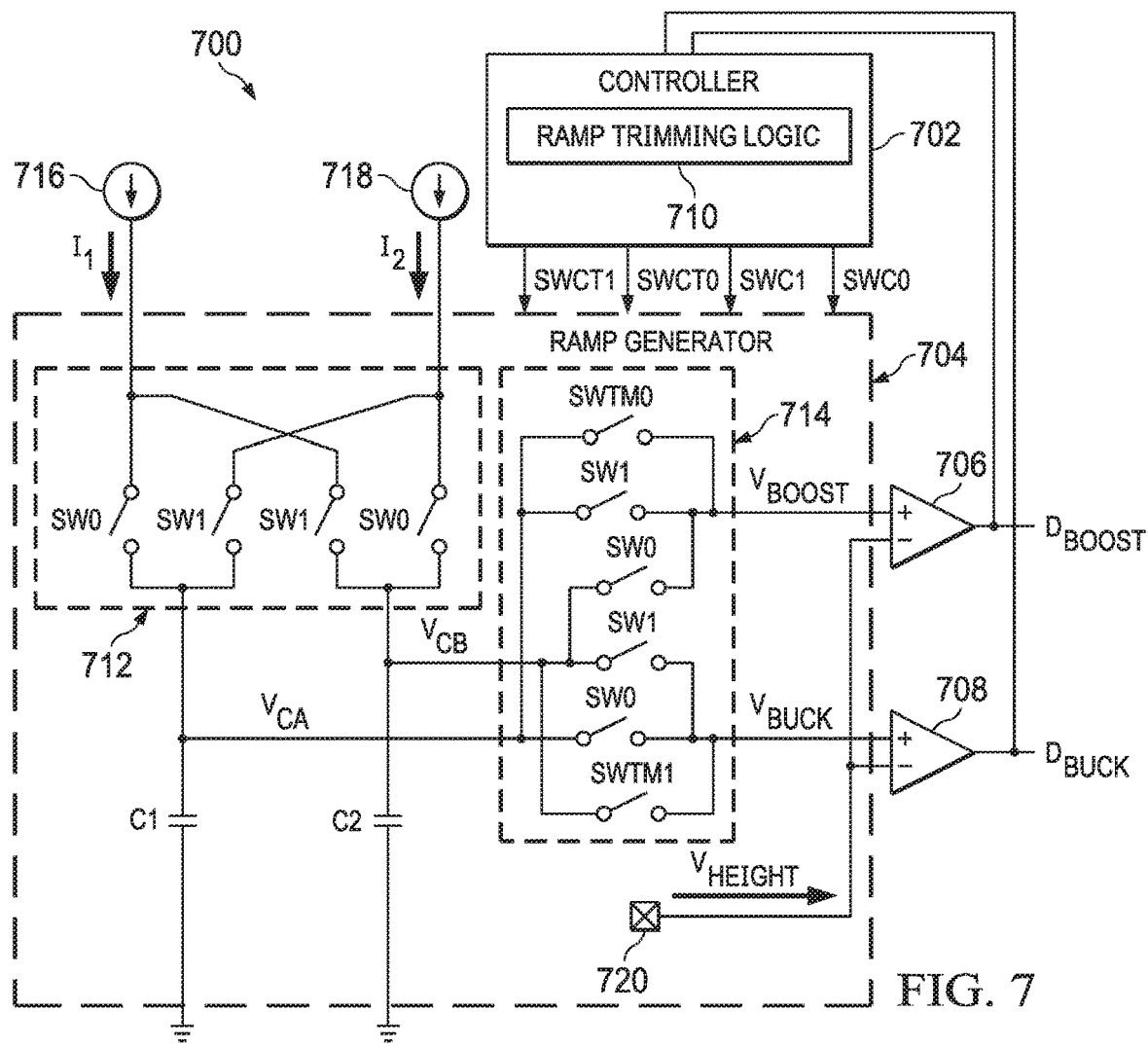
FIG. 7 illustrates an example system for trimming ramp signals.

FIG. 7 illustrates an example system 700 for trimming ramp signals. The system 700 can include a controller 702, a ramp generator 704, and buck and boost comparators 706 and 708. The controller 702 can include ramp trimming logic 710. Thus, in some examples, the controller 702 corresponds to the controller 102 and the ramp trimming logic 710 corresponds to the ramp trimming logic 106, as illustrated in FIG. 1. By way of further example, the buck and boost comparators 706 and 708 correspond to the first and second comparators 140 and 142, as illustrated in FIG. 1. In some examples, the ramp generator 704 corresponds to the ramp generator 108, as illustrated in FIG. 1 or the ramp generator 200, as illustrated in FIG. 2. Thus, in some examples, reference may be made to the example of FIGS. 1 and 2 in the following description of the example of FIG. 7. In some examples, the system 700 can be employed in a buck-boost converter environment.

The ramp trimming logic 710 can be stored in memory (not shown in FIG. 7) of the controller 702 and employed to control operations of a buck-boost converter implementing the ramp generator 704 and the buck and boost comparators 706 and 708. In some examples, the ramp trimming logic 710 is implemented as a set of instructions that can be stored in the memory of the controller 702. In other examples, the ramp trimming logic 710 is implemented as a combination of instructions and circuits that can be configured to perform one or more functions, as described herein. In further examples, the ramp trimming logic 710 is implemented with circuitry that can be configured to implement the one or more functions, as described herein. Although FIG. 7 illustrates the ramp trimming logic 710 as part of the controller 702, in other examples, the ramp trimming logic 710 can be implemented outside the controller 702.

In some examples, mode operating logic is employed to control operating modes of the buck-boost converter. The operating modes can include a test operating mode for trimming a ramp signal. In the test operating mode, the ramp trimming logic 710 can be programmed to cause the controller 702 to selectively generate switch control signals SWC0, SWC1, SWCT1 and SWCT2 to control the ramp generator 704 during the test operating mode. The ramp trimming logic 710 can be programmed to cause the controller 702 to control generation of ramp signals, such as buck and boost ramp signals $V_{BUCK}$, $V_{BOOST}$, as illustrated in FIG. 7, during the test operating mode. Due to process variations (e.g., in capacitor fabrication), a ramp signal may need trimming to ensure proper operation (e.g., switching of the first and second set of switches 148 and 150, as illustrated in FIG. 1) of the buck-boost converter. By way of example, the ramp trimming logic 710 can be programmed during the test operating mode to set a maximum amplitude of at least one of the buck and boost ramp signals.

For example, to set the maximum amplitude of the boost ramp signal, the ramp trimming logic 710 is programmed to cause the controller 702 to generate switch control signals SWC0 and SWCT0. The switch control signal SWC0 can be provided to a first switching circuit 712 of the ramp generator 704 and the switch control signal SWCT0 can be provided to a second switching circuit 714 of the ramp generator 704. In some examples, the first switching circuit 712 is the first switching circuit 118, as illustrated in FIG. 1. The first switching circuit 712 can include switches SW0 and SW1. The second switching circuit 714 can include switches SW0 and SW2 and SWTM1 and SWTM2. The switches SW0 of the first switching circuit 712 can be activated (e.g., closed and opened) based on the switch control signal SWC0 and the switches SW1 of the first switching circuit 712 can be activated based on the switch control signal SWC1 (e.g., during trimming of the buck ramp signal). The switch SWTM0 of the second switching circuit 714 can be activated based on the switch control signal SWCT0 (e.g., during trimming of the boost ramp signal) and the switch SWTM1 of the second switching circuit 714 can be activated based on the switch control signal SWCT1 (e.g., during trimming of the buck ramp signal).

The first switching circuit 712 can be configured to supply a first current signal (labelled as $I_1$ in FIG. 7) from a first current source 716 to a first capacitor C1 and supply a second current signal (labelled as $I_2$ in FIG. 7) from a second current source 718 to a second capacitor C2. The first switching circuit 712 is configured to supply the first current signal from the first current source 716 to the first capacitor and the second current signal from the second current source 718 to the second capacitor in response to the switch control signal SWC0 (e.g., by closing the switches SW0 of the first switching circuit 712 to provide a path for a current to flow to the first and second capacitors). The first capacitor can be configured to store a charge to establish a first voltage signal (labelled as $V_{CA}$ in FIG. 7) according to the first current signal. The second capacitor can be configured to store a charge to establish a second voltage signal (labelled as $V_{CB}$ in FIG. 7) according to the second current signal.

In some examples, the second switching circuit 714 is configured to provide the boost ramp signal based on the first voltage signal with an amplitude that can be proportional to the charge stored at the first capacitor based on the switch control signal SWCT0. For example, the switch SWTM0 of the second switching circuit 714 is activated (e.g., closed) in response to the switch control signal SWCT0 to provide the boost ramp signal. The boost ramp signal can be provided to a first input terminal of the boost comparator 706. In some examples, the first input terminal is a positive input terminal and a second input terminal is a negative terminal of the boost comparator 706, as illustrated in FIG. 7. The boost comparator 706 can be configured to receive at the second input terminal a ramp height reference signal (labelled as $V_{HEIGHT}$ in FIG. 7). In some examples, the second input terminal of the boost comparator 706 is coupled to an input node 720 of the ramp generator 704. The ramp height reference signal can be generated by the controller 702 in response to the ramp trimming logic 710.

The ramp height reference signal can be generated based on an input voltage (e.g., the input voltage $V_{IN}$, as illustrated in FIG. 1) to the buck-boost comparator and a ramp gain value. In some examples, the ramp trimming logic 710 is programmed to begin at a first trim code (e.g., a trim code 0) and step through each trim code until the boost comparator outputs a logical high value. As the ramp trimming logic 710 steps through one trim code (e.g., the trim code 0) to a sequential trim code (e.g., the trim code 1), the boost ramp signal can increase in amplitude by increasing an amount of current being provided by the first current signal from the first current source 716. Thus, the ramp trimming logic 710 for each trim code can increase the amount of current being provided by the first current signal from the first current source 716. The boost comparator 706 can be configured to output the logical high value corresponding to a boost driver signal, $D_{BOOST}$, in response to the ramp height reference voltage having an amplitude equal to the amplitude the boost ramp signal. The mode operating logic 104 can be programmed receive the boost driver signal and log a trim code at which the logical high value was outputted. The logical high value provided by the boost comparator 706 can provide an indication of a capacitance of the first capacitor.

In some examples, a latching circuit (not shown in FIG. 7) can be coupled to the boost comparator 706 to receive the boost driver signal. The latching circuit can be configured to latch in response to detecting the rising edge of the boost driver signal outputted by the boost comparator 706. The latching circuit can be configured to output a latch signal indicative of the capacitance of the first capacitor in response to detecting a rising edge of the boost driver signal. The ramp trimming logic 710 can be programmed to detect the latch signal and log the trim code at which the latching circuit outputted the latch signal. In some examples, the ramp trimming logic 710 can be programmed to generate the ramp trim code based on a main clock signal (e.g., the main clock signal CLK, as illustrated in FIG. 1), such as in response to detecting a rising or falling edge of the main clock signal.

In some examples, to set a maximum amplitude of the buck ramp signal, the ramp trimming logic 710 is programmed to cause the controller 702 to generate switch control signals SWC1 and SWCT1. The switch control signals SWC1 can be provided to the first switching circuit 712 and the SWCT1 can be provided to the second switching circuit 714. The first switching circuit 712 can be configured to supply the second current signal from the second current source 718 to the first capacitor and supply the first current signal from the first current source 716 to the second capacitor in response to the switching control signal SWC1 (e.g., by closing the switches SW1 of the first switching circuit 712 to provide a path for a current to flow to the first and second capacitors). The first capacitor can be configured to store the charge to establish the first voltage signal according to the second current signal. The second capacitor can be configured to store the charge to establish the second voltage signal according to the first current signal.

In some examples, the second switching circuit 714 is configured to provide the buck ramp signal based on the second voltage signal with an amplitude that can be proportional to the charge stored at the second capacitor based on the switch control signal SWCT1. For example, the switch SWTM1 of the second switching circuit 714 is activated (e.g., closed) in response to the switch control signal SWCT1 to provide the buck ramp signal. The buck ramp signal can be provided to a first input terminal of the buck comparator 708. In some examples, the first input terminal is a positive input terminal and a second input terminal is a negative input terminal of the buck comparator 708, as illustrated in FIG. 7. The buck comparator 708 can be configured to receive at the second input terminal the ramp height reference signal $V_{HEIGHT}$. In some examples, the second input terminal of the buck comparator 708 is coupled to the input node 720 of the ramp generator 704.

In some examples, the ramp trimming logic 710 is programmed to begin at the first trim code (e.g., a trim code 0) and step through each trim code until the buck comparator 708 outputs a logical high value. As the ramp trimming logic 710 steps through one trim code (e.g., the trim code 0) to a sequential trim code (e.g., the trim code 1), the buck ramp signal can increase in amplitude by increasing an amount of current being provided by the first current signal from the first current source 716. Thus, the ramp trimming logic 710 for each trim code can increase the amount of current being provided by the first current signal from the first current source 716. The buck comparator 708 can be configured to output the logical high value corresponding to a buck driver signal, $D_{BUCK}$, in response to the ramp height reference voltage having an amplitude equal to the amplitude the buck ramp signal. The logical high value provided by the buck comparator 708 can provide an indication of a capacitance of the second capacitor. The ramp trimming logic 710 can be programmed receive the buck driver signal and log the trim code at which the logical high value was outputted. In some examples, a latching circuit (not shown in FIG. 7) can be coupled to the buck comparator 708 to receive the buck driver signal. The latching circuit can be configured to latch in response to detecting a rising edge of the buck driver signal. The latching circuit can be configured to output a latch signal indicative of the capacitance of the second capacitor in response to detecting the rising edge of the buck driver signal. The ramp trimming logic 710 can be programmed to detect the latch signal and log the trim code at which the latching circuit outputted the latch signal.

By employing the ramp trimming logic 710 to set a ramp height of the ramp signal reduces an amount of time needed for setting the ramp height of the ramp signal in contrast to existing ramp trimming techniques that rely on ATE for ramp trimming, such as frequency trimming techniques. Moreover, the ramp trimming procedure as described herein allows for individual trimming of ramp signals, and thus can reduce errors associated with existing techniques that are based on trimming a select ramp signal and using a determined offset code for the select ramp signal to offset a remaining ramp signal. Furthermore, by using the comparator of the ramp generator 704 to provide the indication of the trim code for each ramp signal improves an accuracy of setting the ramp height at the desired ramp height voltage in contrast to existing ramp trimming techniques.

Figure 8:
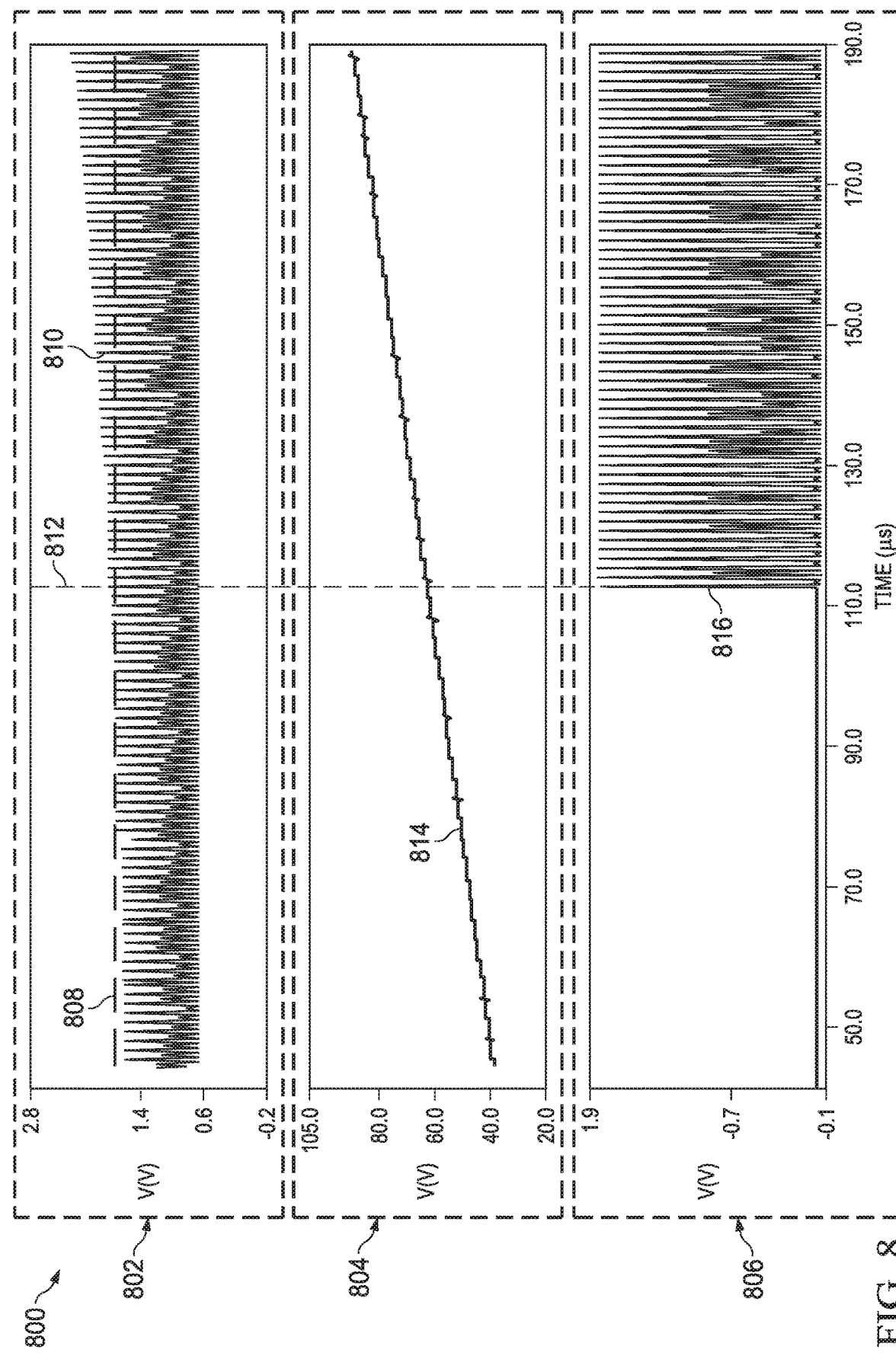
FIG. 8 illustrates an example of a simulation plot illustrating ramp trimming of a ramp signal.

FIG. 8 illustrates an example of a simulation plot 800 illustrating ramp trimming of a ramp signal. In some examples, the simulation plot 800 can be associated with operation of the ramp generator 704 of FIG. 7. Therefore, reference may be made to the example of FIG. 7 in the following description of the example of FIG. 8. The simulation plot 800 includes a first plot 802, a second plot 804, and a third plot 806. Each of the plots 802, 804 and 806 has a vertical axis representing a voltage in volts (V) and a horizontal axis representing time in a time value, such as microseconds (μs). The first plot 802 illustrates a ramp height reference signal 808 relative to a boost ramp signal 810. The ramp height reference signal 808 can correspond to the ramp height reference signal $V_{HEIGHT}$, as illustrated in FIG. 7. The boost ramp signal 810 can correspond to the boost ramp signal $V_{BOOST}$, as illustrated in FIG. 7. As illustrated by the first plot 802, during ramp trimming, the amplitude of the boost ramp signal 810 can increase until 812 corresponding to a moment in time at which the amplitude of the boost ramp signal 810 is equal to an amplitude of the ramp height reference signal 808. As illustrated by the second plot 804, a trim code 814 can be stepped through by ramp trimming logic (e.g., the ramp trimming logic 710, as illustrated in FIG. 7) to increase the amplitude of the boost ramp signal 810 until 812. At the moment of time at about 812, an output of a boost comparator (e.g., the boost comparator 706, as illustrated in FIG. 7), such as a boost driver signal 816 (e.g., the boost driver signal $D_{BOOST}$, as illustrated in FIG. 7) can transition from a logical low value to a logical high value. The logical high value can provide an indication of a capacitance of a capacitor (e.g., the first capacitor C1, as illustrated in FIG. 7).

Figures 9, 10:
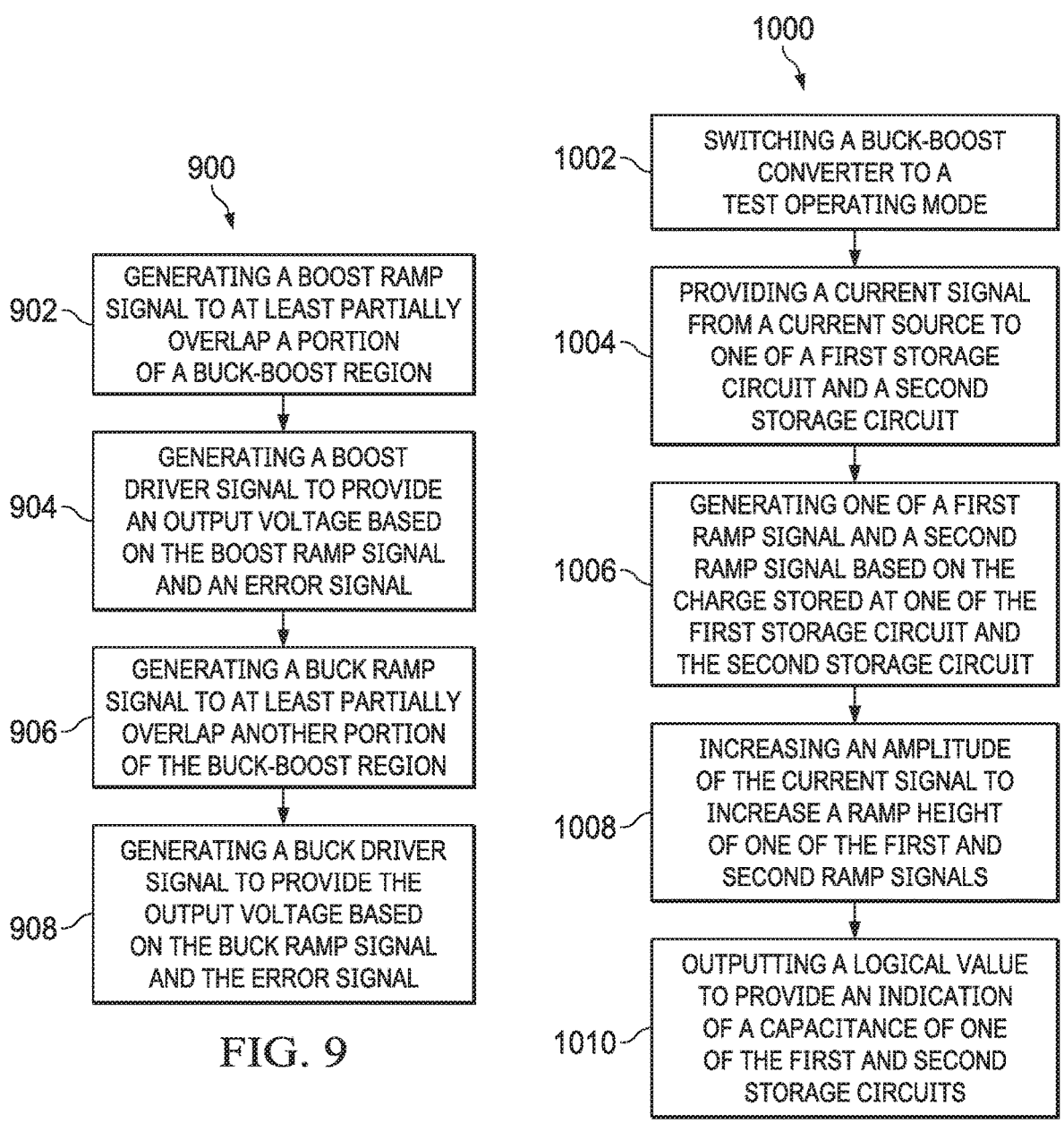
FIG. 9 illustrates an example of a method for operating a buck-boost converter in a buck-boost mode of operation.
FIG. 10 illustrates an example of a method for trimming a ramp signal.

In view of the foregoing structural and functional features described above, example methods will be better appreciated with references to FIGS. 9 and 10. While, for purposes of simplicity of explanation, the example methods of FIGS. 9 and 10 are shown and described as executing serially, it is to be understood and appreciated that the example method is not limited by the illustrated order, as some actions could in other examples occur in different orders, multiple times and/or concurrently from that shown and described herein.

FIG. 9 illustrates an example of a method 900 for controlling a buck-boost converter circuit. The buck-boost converter circuit can correspond to the buck-boost converter 100, as illustrated in FIG. 1. The method can begin at 902, by generating a boost ramp signal to at least partially overlap a portion of a buck-boost region during an on-period of each intermediate clock cycle between clock cycles of a clock signal. The boost ramp signal can be generated by a ramp generator, such as the ramp generator 108, as illustrated in FIG. 1. In other examples, the ramp generator 200 of FIG. 2 is used to generate the boost ramp signal. At the 904, the method can include generating a boost driver signal to provide an output voltage based on the boost ramp signal and an error signal during the on-period of each intermediate clock cycle. The boost driver signal can be generated at a driver circuit, such as the drive circuit 136, as illustrated in FIG. 1. Thus, in some examples, the boost driver signal is generated by the second comparator 142, as illustrated in FIG. 1. In other examples, the boost driver signal is generated by the boost comparator 218, as illustrated in FIG. 2.

At 906, generating a buck ramp signal to at least partially overlap another portion of the buck-boost region during an off-period of each intermediate clock cycle of the clock signal. The buck ramp signal can be generated by a ramp generator, such as the ramp generator 108, as illustrated in FIG. 1. In other examples, the ramp generator 200 of FIG. 2 is used to generate the buck ramp signal. At 908, generating a buck driver signal to provide the output voltage based on the buck ramp signal and the error signal during the off-period of each intermediate clock cycle of the clock signal. The buck driver signal can be generated at a driver circuit, such as the drive circuit 136, as illustrated in FIG. 1. Thus, in some examples, the buck driver signal is generated by the first comparator 140, as illustrated in FIG. 1. In other examples, the buck driver signal is generated by the buck comparator 220, as illustrated in FIG. 2.

FIG. 10 illustrates an example of a method 1000 for trimming a ramp signal. The method can begin at 1002 by causing a buck-boost converter (e.g., the buck-boost converter 100) to switch to a test operating mode. While operating in the test operating mode, the method can include at 1004 providing a current signal from a current source to one of a first storage circuit and a second storage circuit to store a charge. The current source can correspond to one of the first current source 124 or the second current source 126, as illustrated in FIG. 1. Thus, in some examples, the current signal is one of the first current signal $I_1$ or the second current signal $I_2$ as illustrated in FIG. 1.

At 1006, generating one of a first ramp signal and a second ramp signal based on the charge stored at one of the first storage circuit and the second storage circuit. The first and second ramp signals can have an amplitude that is proportional to an amount of charge stored at one of the first storage circuit and the second storage circuit. The first and second storage circuits can correspond to the first and second storage circuits 120 and 122, as illustrated in FIG. 1 or the first and second capacitors C1 and C2, as illustrated in FIGS. 2 and 7. The first and second ramp signals can correspond to the first and second ramp signals $V_1$ and $V_2$, as illustrated in FIG. 1 or the boost and buck ramp signals $V_{BOOST}$, $V_{BUCK}$, as illustrated in FIGS. 2 and 7. At 1008, increasing an amplitude of the current signal to increase a ramp height of one of the first and second ramp signals. For example, ramp trimming logic, such as the ramp trimming logic 106, as illustrated in FIG. 1 or the ramp trimming logic 710, as illustrated in FIG. 7 can be programmed to cause the current signal to increase the amplitude based on an associated trim code. At 1010, outputting at one of a first comparator and a second comparator of the buck-boost converter a logical high value to provide an indication of a capacitance of one of the first and the second storage circuits in response to the amplitude of one of the first ramp signal and the second ramp signal being equal to an amplitude of a ramp height reference signal. The first and second comparators can correspond to the first and second comparators 140 and 142, as illustrated in FIG. 1. In other examples, the first and second comparators are the buck and boost comparators 218 and 220, as illustrated in FIG. 2 or the buck and boost comparators 706 and 708, as illustrated in FIG. 7.

In this description and the claims, the term "based on" means based at least in part on.

Modifications are possible in the described embodiments, and other embodiments are possible, within the scope of the claims.

What is claimed is:

1. A converter circuit, the converter circuit comprising:
   a ramp generator circuit configured to generate a first ramp signal and a second ramp signal during each clock cycle of a clock signal during a buck-boost operating mode of the converter circuit;
   a controller coupled to the ramp generator circuit and including mode operating logic programmed to control an operating mode of the converter circuit, the controller being configured to generate a first switch control signal and a second switch control signal for generating the first and second ramp signals during an intermediate clock cycle between the clock cycles of the clock signal in response to switching from another operating mode to the buck-boost operating mode, the other operating mode comprising one of a buck operating mode and a boost operating mode;

wherein the ramp generator circuit is configured to generate the first ramp signal to at least partially overlap a portion of a buck-boost region during a first portion of the intermediate clock cycle between clock cycles of the clock signal;

wherein the ramp generator circuit is configured to generate the second ramp signal to at least partially overlap a portion of the buck-boost region during a second portion of the intermediate clock cycle between the clock cycles of the clock signal; and wherein the ramp generator circuit further includes:
 a switching circuit configured to provide a first current signal from a first current source and a second current signal from a second current source in response to the first switch control signal during the intermediate clock cycle between the clock cycles of the clock signal, the switching circuit being further configured to provide a first offset current signal from a third current source and a second offset current signal from a fourth current source in response to the second switch control signal during the intermediate clock cycle between the clock cycles of the clock signal;
 a first storage circuit configured to store a first charge based on the first current signal and the first offset current signal, the first storage circuit being configured to provide the first ramp signal based on the first charge to at least partially overlap the portion of the buck-boost region during the first portion of the intermediate clock cycle between the clock cycles of the clock signal; and
 a second storage circuit configured to store a second charge based on the second current signal and the second offset current signal, the second storage circuit being configured to provide the second ramp signal based on the second charge to at least partially overlap the portion of the buck-boost region during the second portion of the intermediate clock cycle between the clock cycles of the clock signal.

2. The converter circuit of claim 1, the control signals further comprising a third switch control signal, the switching circuit being configured to provide the first current signal and the second current signal in response to the third switch control signal during a sequential clock cycle of the clock signal, the switching circuit being further configured to provide a third offset current signal from a fifth current source and a fourth offset current signal from a sixth current source in response to the second switch control signal during the clock cycle of the clock signal.

3. The converter circuit of claim 2,
wherein the first storage circuit is configured to store the first charge based on the second current signal and the fourth offset current signal, the first storage circuit being configured to provide the first ramp signal based on the first charge stored during the sequential clock cycle of the clock signal, such that the first ramp signal does not overlap the buck-boost region, and
wherein the second storage circuit is configured to store the second charge based on the first current signal and the third offset current signal, the second storage circuit being configured to provide the second ramp signal based on the second charge during the sequential clock cycle of the clock signal, such that the second ramp signal does not overlap the buck-boost region.

4. The converter circuit of claim 3, wherein the switching circuit is configured to:
 provide a first current path for the first offset current signal from the third current source to the first storage circuit and a second current path for the first current signal from the first current source to the first storage circuit during the intermediate clock cycle between the clock cycles of the clock signal; and
 provide a third current path for the second offset current signal from the fourth current source to the second storage circuit and a fourth current path for the second current signal from the second current source to the second storage circuit during the intermediate clock cycle between the clock cycles of the clock signal.

5. The converter circuit of claim 4, wherein the switching circuit is configured to:
 provide a fifth current path for the third offset current signal from the fourth current source to the second storage circuit and a sixth current path for the first current signal from the first current source to the second storage circuit during the sequential clock cycle of the clock signal; and
 provide a seventh current path for the fourth offset current signal from the sixth current source to the first storage circuit and an eighth current path for the second current signal from the second current source to the first storage circuit during the sequential clock cycle of the clock signal.

6. The converter circuit of claim 5, wherein the control signals further comprise a reset control signal, the controller being configured to generate the reset control signal in response to detecting a rising edge of the clock signal during the intermediate clock cycle between the clock cycles of the clock signal, and wherein the ramp generator further comprises a reset switch, the reset switch being configured to discharge the first charge stored at the first storage circuit for a sequential charge cycle in response to the reset control signal during the intermediate clock cycle of the clock signal.

7. The converter circuit of claim 6, wherein the reset control signal is a first reset control signal and the reset switch is a first reset switch, the control signals further comprising a second reset control signal, the controller being configured to generate the second reset control signal in response to detecting a subsequent rising edge of the clock signal during the sequential clock cycle of the clock signal, and wherein the ramp generator further comprises a second reset switch, the second reset switch being configured to discharge the second charge stored at the second storage circuit for a sequential charge cycle in response to the second reset control signal during the sequential clock cycle of the clock signal.

8. The converter circuit of claim 6, wherein the first ramp signal at least partially overlaps the buck-boost region corresponds to the first ramp signal having an amplitude that decreases from a first ramp voltage to a second ramp voltage and that increases from the first ramp voltage to the second ramp voltage during the intermediate clock cycle of the clock signal, the buck-boost region corresponding to an error voltage range for an error signal, and the first and second ramp voltages corresponding to voltages within the error voltage range for the error signal.

9. The converter circuit of claim 8, wherein the second ramp signal at least partially overlaps the buck-boost region corresponds to the second ramp signal having an amplitude that increases from the second ramp voltage to the first ramp voltage and decreases from the first ramp voltage to the second ramp voltage during the intermediate clock cycle of the clock signal.

10. The converter circuit of claim 9, wherein the mode operating logic is programmed to cause the converter circuit to operate in a test operating mode, while operating in the test operating mode, the converter circuit being configured to:
receive a respective current signal comprising one of the first current signal and the second current signal from a respective current source, the respective current source comprising one of the first current source and the second current source;
provide the respective current signal to one of the first storage circuit and the second storage circuit to store one of the first charge and the second charge;
generate one of the first ramp signal and the second ramp signal based on one of the first charge and the second charge stored at one of the first storage circuit and the second storage circuit, the amplitude of one of the first ramp signal and the second ramp signal being proportional to an amount of charge stored at one of the first storage circuit and the second storage circuit;
increase an amplitude of the respective current signal to increase a ramp height of one of the first and second ramp signals, the ramp height being the amplitude of one of the first and second ramp signals; and
output at one of a first comparator and a second comparator of the converter circuit a logical high value to provide an indication of a capacitance of one of the first and the second storage circuits in response to the amplitude of one of the first ramp signal and the second ramp signal being equal to an amplitude of a ramp height reference signal.

11. A method for controlling a buck-boost converter circuit, the method comprising:
generating a boost ramp signal to at least partially overlap a portion of a buck-boost region during an on-period of each intermediate clock cycle between clock cycles of the clock signal;
generating a boost driver signal to provide an output voltage based on the boost ramp signal and an error signal during the on-period of each intermediate clock cycle between the clock cycles of the clock signal;
generating a buck ramp signal to at least partially overlap a portion of the buck-boost region during an off-period of each intermediate clock cycle between the clock cycles of the clock signal; and
generating a buck driver signal to provide the output voltage based on the buck ramp signal and the error signal during the off-period of each intermediate clock cycle between the clock cycles of the clock signal;
providing a first current signal and a first offset current signal to a first storage circuit to store a first charge during the intermediate clock cycle between the clock cycles of the clock signal, the first storage circuit being configured to provide the buck ramp signal based on the first charge to at least partially overlap the portion of the buck-boost region during the on-period of the intermediate clock cycle between the clock cycles; and
providing a second current signal and a second offset current signal to a second storage circuit to store a second charge during the intermediate clock cycle between the clock cycles of the clock signal, the second storage circuit being configured to provide the boost ramp signal based on the second charge to at least partially overlap the second portion of the buck-boost region during the off-period of the intermediate clock cycle between the clock cycles.

12. The method of claim 11, further comprising:
providing the second current signal and a third offset current signal to the first storage circuit to store the first charge during a sequential clock cycle of the clock signal, the first storage circuit being configured to provide the buck ramp signal based on the first charge stored during the sequential clock cycle of the clock signal, the buck ramp signal being provided during the sequential clock cycle of the clock signal, such that the buck ramp signal does not overlap the buck-boost region; and
providing the first current signal and a fourth offset current signal to the second storage circuit to store the second charge during the sequential clock cycle of the clock signal, the second storage circuit being configured to provide the boost ramp signal based on the second charge stored during the sequential clock cycle of the clock signal, the boost ramp signal being provided during the sequential clock cycle of the clock signal, such that the boost ramp signal does not overlap the buck-boost region.

13. The method of claim 12, further comprising:
causing the first storage circuit to be discharged for a sequential charge cycle in response to a first reset control signal during the intermediate clock cycle between the clock cycles of the clock signal; and
causing the second storage circuit to be discharged for a sequential charge cycle in response to a second reset control signal during the sequential clock cycle of the clock signal.

14. The method of claim 13,
wherein the boost ramp signal has an amplitude that decreases from a first ramp voltage to a second ramp voltage and then increases from the first ramp voltage to the second ramp voltage during the intermediate clock cycle between the clock cycles of the clock signal corresponding to at least partially overlapping the portion of the buck-boost region during the on-period of the intermediate clock cycle; and
wherein buck ramp signal has an amplitude that increases from the second ramp voltage to the first ramp voltage and decreases from the first ramp voltage to the second ramp voltage during the intermediate clock cycle between the clock cycles of the clock signal corresponding to at least partially overlapping the second portion of the buck-boost region during the off-period of the intermediate clock cycle.

15. The method of claim 14, further comprising:
causing the buck-boost converter circuit to switch to a test operating mode, and while operating in the test operating mode, the method further comprising:
providing a respective current signal to one of the first storage circuit and the second storage circuit to store one of the first charge and the second charge, the respective current signal comprising one of the first current signal and the second current signal;
generating one of the boost ramp signal and the buck ramp signal based on one of the first and the second charge stored at one of the first storage circuit and the second storage circuit, the buck and boost ramp signals having an amplitude that is proportional to an amount of charge stored at one of the first storage circuit and the second storage circuit;

increasing an amplitude of the respective current signal to increase a ramp height of one of the boost and buck ramp signals, the ramp height being the amplitude of one of the boost and buck ramp signals; and outputting at one of a buck comparator and a boost comparator of the buck-boost converter circuit a logical high value to provide an indication of a capacitance of one of the first and the second storage circuits in response to the amplitude of one of the boost ramp signal and the buck ramp signal being equal to an amplitude of a ramp height reference signal.

\* \* \* \* \*